(12) United States Patent
Mashiko et al.

(10) Patent No.: US 8,119,270 B2
(45) Date of Patent: Feb. 21, 2012

(54) LEAD ACID BATTERY WITH LIQUID SENSOR IN LID

(75) Inventors: Wataru Mashiko, Kyoto (JP);
Mitsunori Maeda, Kyoto (JP);
Hiroyasu Kawada, Kyoto (JP); Takashi Akimoto, Kyoto (JP); Tomohiro Imamura, Kyoto (JP); Motoshi Kiribayashi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 181 days.

(21) Appl. No.: 12/376,410

(22) PCT Filed: Aug. 3, 2007

(86) PCT No.: PCT/JP2007/065302
§ 371 (c)(1),
(2), (4) Date: Feb. 20, 2009

(87) PCT Pub. No.: WO2008/016152
PCT Pub. Date: Feb. 7, 2008

(65) Prior Publication Data
US 2010/0297478 A1    Nov. 25, 2010

(30) Foreign Application Priority Data

Aug. 4, 2006   (JP) ................... 2006-213952
Aug. 4, 2006   (JP) ................... 2006-213953
Aug. 4, 2006   (JP) ................... 2006-213954
Aug. 4, 2006   (JP) ................... 2006-213955
Aug. 4, 2006   (JP) ................... 2006-213956

(51) Int. Cl.
*H01M 10/48*   (2006.01)
*H01M 2/04*   (2006.01)

(52) U.S. Cl. ........... 429/92; 429/175; 429/225; 429/204

(58) Field of Classification Search ................. 429/7, 72
See application file for complete search history.

(56) References Cited

U.S. PATENT DOCUMENTS
3,937,636 A * 2/1976 Slautterback ................. 429/7
(Continued)

FOREIGN PATENT DOCUMENTS
JP        02136970     * 11/1990
(Continued)

OTHER PUBLICATIONS

International Search Report for International Appln No. PCT/JP2007/065302, Japanese Patent Office, mailed on Oct. 30, 2007, 6 pages.

*Primary Examiner* — Keith Walker
(74) *Attorney, Agent, or Firm* — Sterne, Kessler, Goldstein & Fox, P.L.L.C.

(57) ABSTRACT

An object of the invention is to provide a lead acid battery having a liquid surface sensor (3) installed to a liquid surface sensor installation portion (2a) on a top face of a container lid (2), an electronic circuit board (4) contained in a recessed portion (2b) on the top face of the container lid (2), terminal connecting conductors (5a, 6a) connecting the electronic circuit board (4) to terminals (5, 6), and a liquid surface sensor connecting conductor (8) connecting the liquid surface sensor (3) to the electronic circuit board (4), preventing from catching on an object on the top face of the container lid (2) by insert molding the terminal connecting conductors (5a, 6a) and the liquid surface sensor connecting conductor (8) in the container lid (2), preventing the terminal connecting conductors (5a, 6a) and the liquid surface sensor connecting conductor (8) from being corroded by an electrolyte solution even if the electrolyte solution is spotted on the top face, and improving the outer appearance.

1 Claim, 11 Drawing Sheets

U.S. PATENT DOCUMENTS 6,110,617 A * 8/2000 Feres .............................. 429/86

FOREIGN PATENT DOCUMENTS

| JP | H 02-136970 | | 11/1990 |
| JP | H 05-015322 | | 2/1993 |
| JP | H 05-074502 | | 3/1993 |
| JP | H 05-082174 | | 4/1993 |
| JP | 2005166318 | * | 6/2003 |
| JP | 2004-200142 | | 7/2004 |
| JP | 2004200142 A | * | 7/2004 |
| JP | 2005-116286 | | 4/2005 |
| JP | 2005-129338 | | 5/2005 |
| JP | 2005-166318 | | 6/2005 |

* cited by examiner

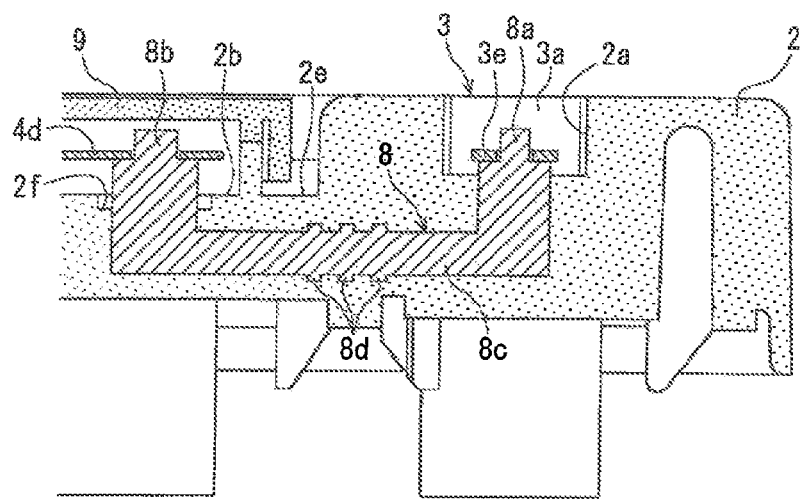
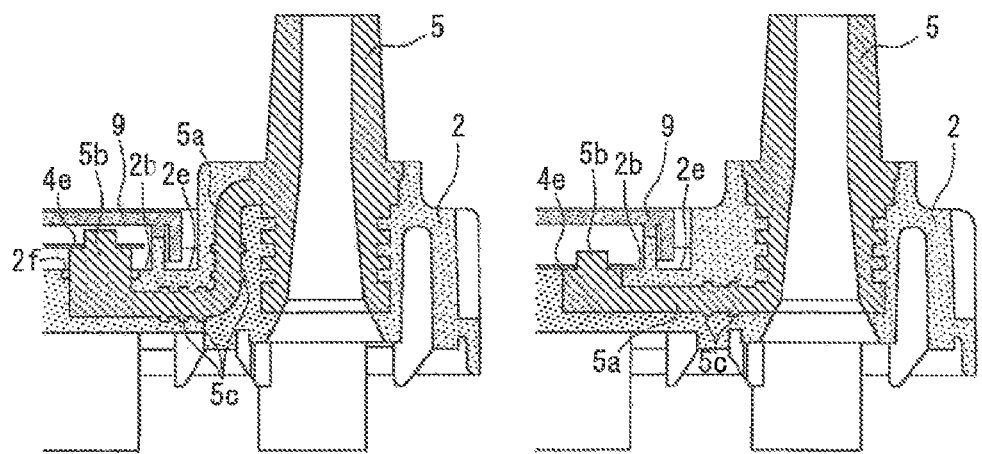

LEAD ACID BATTERY WITH LIQUID SENSOR IN LID

TECHNICAL FIELD

The present invention relates to a lead acid battery in which an electric component such as a liquid surface sensor detecting a liquid surface of an electrolyte solution and an electronic circuit component connected to the electric component are attached to a container lid covering an upper end portion of a container.

BACKGROUND ART

In recent years, a computerization of auxiliary machines such as an idling stop system, an air conditioner, a brake, a power steering, and the like has been advanced, the reliability of the lead acid battery is demanded ever more, and a technique for accurately detecting a charged state and a deteriorated state of the lead acid battery has become necessary. For example, in a liquid type lead acid battery, there has been a structure in which a liquid surface sensor and a liquid surface detecting circuit are attached to a container lid, for detecting whether or not the liquid surface of an electrolyte solution filled in a cell chamber of a container becomes lower than a predetermined height, at a time of a maintenance operation, and an alarm apparatus such as a buzzer, a lamp, or the like is activated in the case where the liquid surface of the electrolyte solution becomes lower than the predetermined height (for example, see Patent Documents 1 to 3).

An example of the lead acid battery is shown in FIG. 15. The lead acid battery is structured such that a liquid surface sensor installation portion 2a is provided in a container lid 2 covering an upper end portion of a container 1, a liquid surface sensor 3 is installed to the liquid surface sensor installation portion 2a, a recessed portion 2b is formed in the container lid 2, and an electronic circuit board 4 is contained in the recessed portion 2b. Further, positive and negative terminals 5 and 6 of the lead acid battery protrude from an upper face of the container lid 2.

The liquid surface sensor 3 is a sensor detecting whether or not the liquid surface of the electrolyte solution filled in the cell chamber of the container 1 is equal to or higher than the predetermined height, and the electronic circuit board 4 is a board mounting a liquid surface detecting circuit detecting the fact that the liquid surface of the electrolyte solution has become lower than the predetermined height based on the sensor signal from the liquid surface sensor 3. Further, an LED 4a and a buzzer 4b giving an alarm in the case where the liquid surface detecting circuit detects the fact that the liquid surface of the electrolyte solution has become lower than the predetermined height is mounted to a face of the electronic circuit board 4, and a switch 4c turning on and off an electric power supply of the liquid surface detecting circuit is also mounted thereto. The recessed portion 2b containing the electronic circuit board 4 is appropriately covered by a recessed portion lid or filled with a resin.

A lead wire 3f is derived from the liquid surface sensor 3, and the structure is made such that a sensor signal is outputted by connecting the lead wire 3f to the electronic circuit board 4. Further, connection rings 7 and 7 are connected respectively to terminals 5 and 6 protruding from the top face of the container lid 2, and the structure is made such that electric power is fed by connecting lead wires 7a and 7a derived from the connection rings 7 and 7 to the electronic circuit board 4.

However, when the lead wire 3f of the liquid surface sensor 3 and the lead wires 7a and 7a of the connection rings 7 and 7 are connected to the electronic circuit board 4, the lead wires 3f and 7a pass through the top face of the container lid 2. Accordingly, the lead wires 3f and 7a catches on an object at a time of transporting the lead acid battery or are sandwiched by a fixture at a time of installing the battery to a motor vehicle or the like, and there is a risk that the lead wires are disconnected. Further, there is a problem that if the electrolyte solution is spotted on the top face of the container lid 2, there is a risk that it is corroded. Further, there is a problem that an outer appearance is not good. Accordingly, in order to prevent the disconnection caused by the catching on of the lead wires 3f and 7a or the like, the structure may be made such that a groove is formed between the liquid surface sensor installation portion 2a on the top face of the container lid 2 or the terminals 5 and 6 and the recessed portion 2b, and the lead wire 3f and the lead wires 7a and 7a are fitted into the groove so as to be passed therethrough, however, even in this case, it is impossible to solve the problem of corrosion caused by the electrolyte solution. Further, it is impossible to solve the problem of unpreferable outer appearance.

Patent Document 1: Japanese Unexamined Utility Model Publication No. 05-015322

Patent Document 2: Japanese Unexamined Patent Publication No. 05-082174

Patent Document 3: Japanese Unexamined Patent Publication No. 05-074502

DISCLOSURE OF THE INVENTION

Problem to be Solved by the Invention

The present invention aims at providing a lead acid battery which can prevent a lead wire or the like from passing through a top face of a container lid, by connecting positive and negative terminals or an electric component to an electronic circuit component via a terminal connecting conductor or an electric component connecting conductor insert-molded in the container lid, thereby solving a problem such as possible disconnection and corrosion caused by an electrolyte solution, and further has a good appearance.

Means for Solving the Problems

In accordance with an embodiment, there is provided a lead acid battery including: an electric component installed to an electric component installation portion on a top face of a container lid; an electronic circuit component contained in a recessed portion of the top face of the container lid; and a terminal connecting conductor insert-molded in the container lid by connecting the electronic circuit component with a terminal of the lead acid battery.

In accordance with an embodiment, there is provided a lead acid battery including: an electronic circuit component contained in a recessed portion on a top face of a container lid; and a terminal connecting conductor insert-molded in the container lid so as to connect the electronic circuit component and a terminal of the lead acid battery, wherein the terminal connecting conductor is derived from an intermediate portion of the terminal to hang to a predetermined lower position and is thereafter drawn out in a horizontal direction.

In accordance with an embodiment, there is provided a lead acid battery including: an electric component installed to an electric component installation portion on a top face of a container lid; an electronic circuit component contained in a recessed portion on the top face of the container lid; and an electric component connecting conductor insert-molded in the container lid by connecting the electric component with the electronic circuit component.

In accordance with an embodiment, there is provided a lead acid battery, wherein the electric component connecting conductor includes a first raised terminal portion for connecting the electric component, a second raised terminal portion for connecting the electronic circuit component, and a rod-shaped intermediate conductor portion for connecting the raised terminal portions each other.

In accordance with an embodiment, there is provided a lead acid battery, wherein the electric component is a liquid surface sensor.

In accordance with an embodiment, there is provided a lead acid battery including: an electronic circuit component contained in a recessed portion on a top face of a container lid; and a terminal connecting conductor insert-molded in the container lid for connecting the electronic circuit component with a terminal of the lead acid battery, wherein the electronic circuit component is arranged so as to be away from a bottom face of the recessed portion by a supporting raised body formed in the bottom face of the recessed portion.

In accordance with an embodiment, there is provided a lead acid battery, wherein the container lid is provided with a reflow chamber for reflowing an electrolyte solution or a condensed solution of a water vapor into the container.

In accordance with an embodiment, there is provided a lead acid battery, wherein the recessed portion is covered with a recessed portion lid.

In accordance with an embodiment, there is provided a lead acid battery including: an electronic circuit component contained in a recessed portion on a top face of a container lid; and a recessed portion lid covering the recessed portion, wherein a top face of the recessed portion lid is formed lower than a top face of the other portions of the container lid than the recessed portion lid, or a top face of a component attached to the other portions of the container lid.

In accordance with an embodiment, there is provided a lead acid battery including: an electronic circuit component contained in a recessed portion on a top face of a container lid; and a recessed portion lid covering the recessed portion, wherein at least two filling opening portions for filling the recessed portion with resin are formed in the recessed portion lid.

Effects of the Invention

In accordance with an embodiment, since the terminal connecting conductor connecting the terminal to the electronic circuit component is insert-molded in the container lid, it is possible to prevent the terminal connecting conductor from passing through the top face of the container lid. Accordingly, it is possible to prevent the terminal connecting conductor from being disconnected, e.g., by catching on an object on the top face of the container lid. Further, since the terminal connecting conductor is not simply fitted into a groove or the like on the top face of the container lid, but is embedded by means of the insert molding, it is possible to prevent the terminal connecting conductor from being corroded by the electrolyte solution even if the electrolyte solution is spotted on the top face of the container lid. Further, the outer appearance of the top face of the container lid is improved.

In accordance with an embodiment, since the terminal connecting conductor is bent in a crank shape in the inner portion of the container lid so as to have a long length, it is possible to delay entering of the electrolyte solution so as to prevent a connected portion with the electronic circuit component from being corroded, even if the electrolyte solution enters from the interface between the terminal and the container lid.

In accordance with an embodiment, since the electric component connecting conductor connecting the electric component with the electronic circuit component is insert molded in the container lid, the electric component connecting conductor does not pass through the top face of the container lid. Accordingly, it is possible to prevent the electric component connecting conductor from being disconnected, e.g., by catching on an object on the top face of the container lid. Further, since the electric component connecting conductor is not simply fitted into a groove or the like on the top face of the container lid, but is embedded by means of the insert molding, it is possible to prevent the electric component connecting conductor from being corroded by the electrolyte solution even if the electrolyte solution is spotted on the top face of the container lid. Further, the outer appearance of the top face of the container lid is improved.

In accordance with an embodiment, since the electric component connecting conductor is provided with the raised terminal portion, it is possible to facilitate welding work at a time of connecting the electric component or the electronic circuit component.

In accordance with an embodiment, it is possible to prevent the electric component connecting conductor connecting the liquid surface sensor with the electronic circuit component and the terminal connecting conductor from passing through the top face of the container lid. Accordingly, it is possible to prevent the electric component connecting conductor or the terminal connecting conductor from being disconnected, e.g., by catching on an object on the top face of the container lid. Further, since the electric component connecting conductor and the terminal connecting conductor are not simply fitted into a groove or the like on the top face of the container lid, but are embedded by means of the insert molding, it is possible to prevent the electric component connecting conductor and the terminal connecting conductor from being corroded by the electrolyte solution even if the electrolyte solution is spotted on the top face of the container lid. Further, the outer appearance of the top face of the container lid is improved.

In accordance with an embodiment, the electronic circuit component can be arranged so as to be away from the bottom face of the recessed portion by being supported to the supporting raised body, and it is possible to prevent the circuit component from being corroded, even if water or the electrolyte solution enters the bottom face of the recessed portion.

In accordance with an embodiment, it is possible to prevent the electric component connecting conductor and the terminal connecting conductor connecting the electronic circuit component with the electric component or the terminal from passing through the top face of the container lid, even in the lead acid battery provided with the reflow chamber in the container lid. Accordingly, it is possible to prevent the electric component connecting conductor and the terminal connecting conductor from being disconnected, e.g., by catching on an object on the top face of the container lid. Further, since the electric component connecting conductor and the terminal connecting conductor are not simply fitted into a groove or the like on the top face of the container lid, but are embedded by means of the insert molding, it is possible to prevent the electric component connecting conductor and the terminal connecting conductor from being corroded by the electrolyte solution even if the electrolyte solution is spotted on the top face of the container lid. Further, the outer appearance of the top face of the container lid is improved.

In accordance with an embodiment, it is possible to securely prevent water or the electrolyte solution from entering the recessed portion containing the electronic circuit component, by covering the recessed portion by the recessed portion lid.

In accordance with an embodiment, since the top face of the recessed portion lid is lower than the other portions of the container lid or the like and the top face of the component, fastening force is applied only to the top face of the container lid in the case of placing a fixture over the container lid to fasten the fixture downward, for example, at a time of installing the lead acid battery to a motor vehicle or the like, and is prevented from being applied to the recessed portion lid. Accordingly, it is possible to prevent, e.g., the electronic circuit component in the internal portion from being disconnected and the mounted component from being broken, which are generated by strong force application to the top face of the recessed portion lid.

In accordance with an embodiment, since two or more filling opening portions for filling the recessed portion lid with resin are formed, the resin can be filled in the recessed portion from at least one of the filling opening portions and the air within the recessed portion can be discharged from at least the other one of the filling opening portions, it is possible to sufficiently fill the resin into the back of the recessed portion so as to securely protect the electronic circuit component.

BRIEF DESCRIPTION OF THE DRAWINGS

FIG. 2 shows the first embodiment in accordance with the present invention and is a partly enlarged longitudinal cross-sectional view showing a connecting portion between a liquid surface sensor and an electronic circuit board via a liquid surface sensor connecting conductor.

FIG. 3 shows the first embodiment in accordance with the present invention and is a partly enlarged longitudinal cross-sectional view showing a connecting portion between a positive electrode terminal and the electronic circuit board via a terminal connecting conductor.

Figure 1:
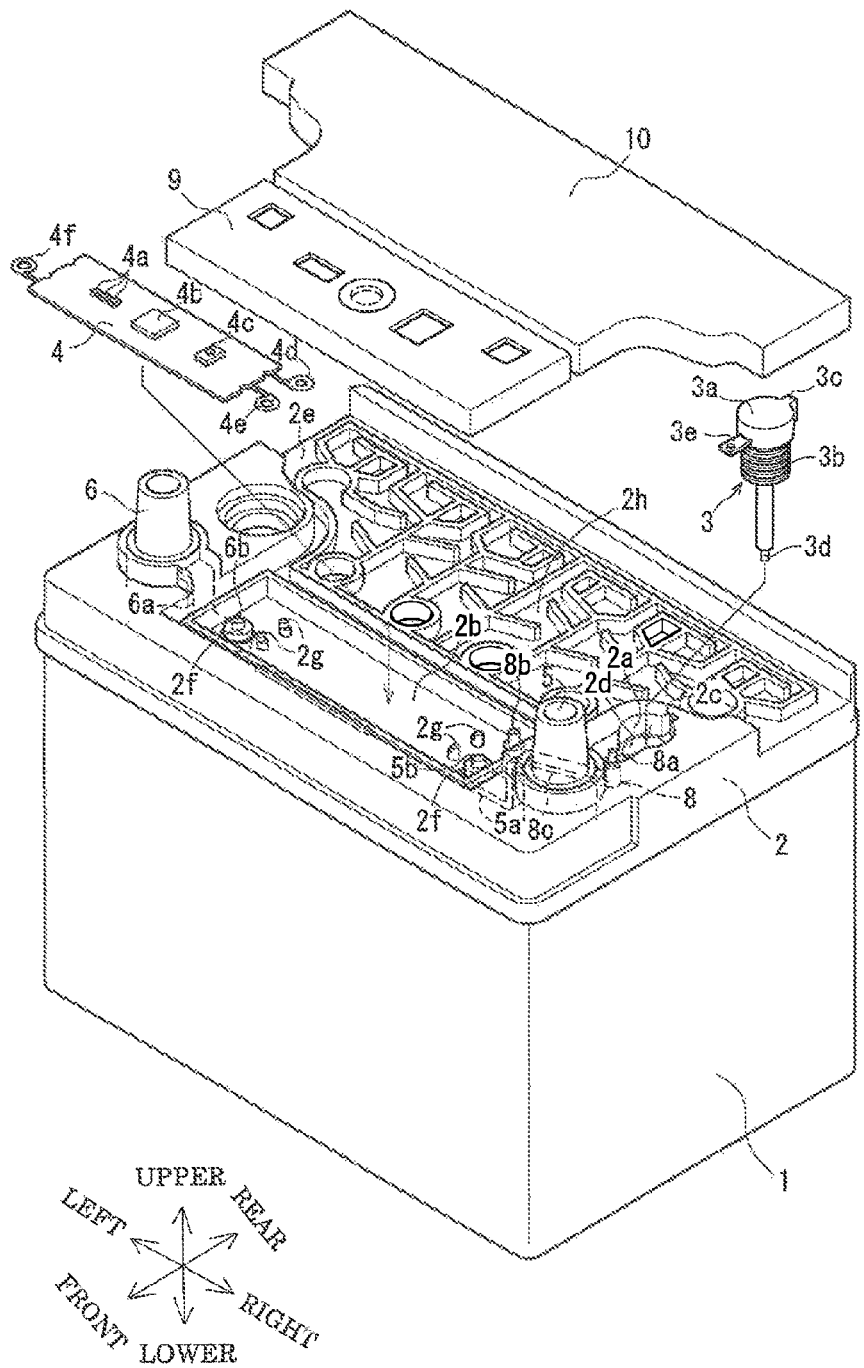
FIG. 1 shows a first embodiment in accordance with the present invention and is an exploded perspective view showing a structure of a lead acid battery.

DESCRIPTION OF REFERENCE NUMERALS 1 container
2 container lid
2$a$ liquid surface sensor installation portion
2$b$ recessed portion
2$c$ fitting portion
2$d$ through hole
2$e$ depression
2$f$ annular groove
2$g$ supporting raised body
2$h$ reflow space
2$i$ liquid filling port
2$j$ liquid filling port
2$k$ groove portion
2$m$ positioning raised body
2$n$ resin
2$o$ raised portion
3 liquid surface sensor
3$a$ head portion
3$b$ annular protruding body
3$c$ positioning fitting projection
3$d$ liquid surface detecting electrode
3$e$ connecting terminal
3$f$ lead wire
4 electronic circuit board
4$a$ LED
4$b$ buzzer
4$c$ switch
4$d$ liquid surface sensor connecting terminal
4$e$ electric power supply connecting terminal
4$f$ electric power supply connecting terminal
5 positive electrode terminal
5$a$ terminal connecting conductor
5$b$ sub terminal
5$c$ annular projection
6 negative electrode terminal
6$a$ terminal connecting conductor
6$b$ sub terminal
7 connection ring
7$a$ lead wire
8 liquid surface sensor connecting conductor
8$a$ first raised terminal portion
8$b$ second raised terminal portion
8$c$ rod-shaped intermediate conductor portion
8$d$ annular projection
8$e$ insert molding support body 9 recessed portion lid
9a opening window
9b opening window
9c opening window
9d filling opening portion
9e filling opening portion
10 reflow chamber lid
11 filter
12 transparent resin cover

BEST MODE FOR CARRYING OUT THE INVENTION

A description will be given below of the best mode for carrying out the invention with reference to FIGS. 1 to 14. In these drawings, the same reference numerals are attached to constructing members having the same functions.

First Embodiment

A description will be given of a lead acid battery in accordance with the present embodiment mainly by paying attention to a terminal connecting conductor connecting an electronic circuit component with a terminal of the lead acid battery. The lead acid battery includes a container 1 made of a resin and having a rectangular vessel shape, and a container lid 2 closing and sealing a top end opening portion of the container 1 and made of a resin, as shown in FIG. 1. An inner portion of the container 1 is partitioned into a plurality of cell chambers by a partition wall, a charging element is contained in each of the cell chamber, and an electrolyte solution is filled in each of the cell chamber. Further, the charging elements are connected in series within the container 1.

The container lid 2 is sealed and firmly attached to the top end opening portion of the container 1 through thermal welding or the like. Further, positive and negative terminals 5 and 6 made of a lead or the like are insert-molded in the container lid 2, and top end portions of the terminals 5 and 6 are so structured as to protrude from the top face of the container lid 2. The terminals 5 and 6 are connected to both ends of charging elements connected in series within the container 1 so as to form an external terminal of the lead acid battery.

A liquid surface sensor installation portion 2a is formed on the top face of the container lid 2. The liquid surface sensor installation portion 2a is a hole formed in the top face of the container lid 2, and this hole is provided with a rectangular positioning fitting portion 2c pierced from a rearward end toward a further rearward side, and a through hole 2d communicating with an inside portion of the container 1 from a rearward portion of a bottom face of the hole. Further, a top portion of a first raised terminal portion 8a of a liquid surface sensor connecting conductor 8 described below protrudes to a forward end of the bottom face in the hole of the liquid surface sensor installation portion 2a.

A liquid surface sensor 3 is installed to the liquid surface sensor installation portion 2a. The liquid surface sensor 3 is constituted by a rod-shaped body made of a resin, and is structured such that an annular protruding body 3b obtained by arranging a number of thin discs vertically is provided below a disc-shaped head portion 3a, and a thin tube body is protruded thereunder, and a positioning fitting projection 3c is protruded rearward from a rear end of the head portion 3a. Further, the liquid surface sensor 3 is structured such that a liquid surface detecting electrode 3d made of an conductor such as lead is embedded in a shaft center portion so as to be exposed at its lower end portion from a lower side of the tube body, and a connecting terminal 3e made of a conductor such as lead is protruded from a forward end of the head portion 3a. The connecting terminal 3e is connected to the liquid surface detecting electrode 3d in an inner portion of the head portion 3a and is derived from the head portion 3a, and a hole portion is formed in a forward leading end portion. The liquid surface detecting electrode 3d and the connecting terminal 3e are formed as the liquid surface sensor 3 through insert molding, by using an integrally molded product by lead casting.

Further, a recessed portion 2b for containing the electronic circuit board 4 is formed on the top face of the container lid 2. The recessed portion 2b corresponds to a recessed portion surrounding a forward portion of a depression 2e formed in the top face of the container lid 2 by a rectangular partition wall, and the electronic circuit board 4 is contained in the inner portion thereof. Further, a top portion of a second raised terminal portion 8b of the liquid surface sensor connecting conductor 8 protrudes at a corner portion in a right rearward side of the bottom face of the recessed portion 2b, and top portions of sub terminals 5b and 6b of terminal connecting conductors 5a and 6a described below protrude at left and right end portions of the bottom face.

The liquid surface sensor connecting conductor 8 is a connecting conductor made of lead or the like, as shown in FIG. 2, and is structured by connecting between the first raised terminal portion 8a and the second raised terminal portion 8b through a rod-like intermediate conductor portion 8c. The first raised terminal portion 8a is a terminal portion for connecting to the liquid surface sensor 3, and is constituted by a large diameter portion connected to the rod-like intermediate conductor portion 8c, and a small diameter portion existing on the large diameter portion and being smaller than the large diameter portion. The second raised terminal portion 8b is a terminal portion for connecting to the electronic circuit board 4 and is constituted by a large diameter portion connected to the rod-like intermediate conductor portion 8c and a small diameter portion existing on the large diameter portion and being smaller than the large diameter portion. The rod-like intermediate conductor portion 8c is a rectangular rod-like portion connecting the large diameter portions of both the raised terminal portions 8a and 8b, and a collar-shaped annular projection 8d is formed at three positions near a center portion in a longitudinal direction. Further, both the raised terminal portions 8a and 8b and the rod-like intermediate conductor portion 8c are integrally formed by lead casting.

The liquid surface sensor connecting conductor 8 is insert-molded in the container lid 2. At this time, all the small diameter portion of the first raised terminal portion 8a and a top portion of the large diameter portion are exposed while protruding from the bottom face of the hole of the liquid surface sensor installation portion 2a, and all the small diameter portion of the second raised terminal portion 8b and a top portion of the large diameter portion are exposed while protruding from a corner portion in a right rearward side of the bottom face of the recessed portion 2b.

The liquid surface sensor 3, as shown in FIG. 1, is installed by inserting a tube body in which the liquid surface detecting electrode 3d is exposed at a lower portion to the through hole 2d of the liquid surface sensor installation portion 2a, press fitting the annular protruding body 3b into the through hole 2d, and fitting the head portion 3a to the hole of the liquid surface sensor installation portion 2a. Further, at this time, the hole portion of the connecting terminal 3e of the liquid surface sensor 3 is fitted to the small diameter portion of the first raised terminal portion 8a of the liquid surface sensor connecting conductor 8 so as to be locked on the large diameter portion, by fitting the positioning fitting projection 3c of the head portion 3a of the liquid surface sensor 3 to the positioning fitting portion 2c of the liquid surface sensor installation portion 2a. Further, the connecting terminal 3e is weld-connected by heating and welding the small diameter portion of the first raised terminal portion 8a from above. The liquid surface sensor 3 is structured such that when the liquid surface sensor 3 is installed to the liquid surface sensor installation portion 2a in this manner, the liquid surface detecting electrode 3d exposed in the lower end portion is immersed into the electrolyte solution at a time when the liquid surface becomes equal to or higher than a predetermined height by filling the electrolyte solution in the cell chamber of the container 1.

The terminal connecting conductor 5a is a connecting conductor portion derived from the positive electrode terminal 5 and made of lead or the like, as shown in FIG. 3A, and is provided with the sub terminal 5b at a leading end portion thereof. The sub terminal 5b is a terminal portion for connecting to the electronic circuit board 4, and is constituted by a large diameter portion forming a leading end portion of the terminal connecting conductor 5a and a small diameter portion existing on the large diameter portion and being smaller than the large diameter portion. Further, a portion running into the sub terminal 5b in the terminal connecting conductor 5a is a rectangular rod-like portion which is bent in a crank shape by being derived from an intermediate portion of the positive electrode terminal 5 to a left side so as to hang to a predetermined lower position, and being thereafter drawn out in a horizontal direction, and a collar-shaped annular projection 5c is formed at a plurality of positions in a midstream in the drawn-out direction. Further, the terminal connecting conductor 5a is integrally formed by lead casting together with the positive electrode terminal 5.

The terminal connecting conductor 6a is a connecting conductor portion derived from the negative electrode terminal 6 and made of lead or the like, as shown in FIG. 1, and is provided with the sub terminal 6b at a leading end portion thereof. The sub terminal 6b is also a terminal portion for connecting to the electronic circuit board 4, and is constituted by a large diameter portion forming a leading end portion of the terminal connecting conductor 6a and a small diameter portion existing on the large diameter portion and being smaller than the large diameter portion. Further, a portion running into the sub terminal 6b in the terminal connecting conductor 6a is a rectangular rod-like portion which is bent in a crank shape by being derived from an intermediate portion of the negative electrode terminal 6 to a right side so as to hang to a predetermined lower position, and being thereafter drawn out in a horizontal direction, and a collar-shaped annular projection (not shown) is formed at a plurality of positions in a midstream in the drawn-out direction, in the same manner as the annular projection 5c. Further, the terminal connecting conductor 6a is integrally formed by lead casting together with the negative electrode terminal 6.

The terminal connecting conductors 5a and 6a are insert-molded in the container lid 2 together with the terminals 5 and 6. At this time, all the small diameter portions of the sub terminals 5b and 6b and top portions of the large diameter portions are exposed while protruding from the bottom face of the recessed portion 2b. Further, annular grooves 2f and 2f are formed in the bottom face of the recessed portion 2b surrounding a periphery of the large diameter portions of the sub terminals 5b and 6b.

The electronic circuit board 4 is locked to supporting raised bodies 2g at four positions protruding from the bottom face of the recessed portion 2b so as to be contained therein. Further, as shown in FIGS. 1 and 2, the liquid surface sensor connecting terminal 4d is connected by welding by fitting the hole portion of the liquid surface sensor connecting terminal 4d derived from the electronic circuit board 4 to the small diameter portion of the second raised terminal portion 8b of the liquid surface sensor connecting conductor 8 so as to be locked on the large diameter portion, and heating and welding the small diameter portion of the second raised terminal portion 8b from above. Accordingly, the electronic circuit board 4 is connected to the liquid surface detecting electrode 3d of the liquid surface sensor 3 via the liquid surface sensor connecting conductor 8. Further, as shown in FIGS. 1 and 3A, the liquid surface sensor connecting terminal 4d is connected by welding by fitting the electric power supply connecting terminals 4e and 4f derived from the electronic circuit board 4 to the small diameter portions of the sub terminals 5b and 6b protruding to both the left and right end portions of the bottom face of the recessed portion 2b so as to be locked on the large diameter portion, and heating and welding the small diameter portion of the second raised terminal portion 8b from above. Accordingly, the electronic circuit board 4 can be fed with electric power through the positive and negative terminals 5 and 6 of the lead acid battery.

The electronic circuit board 4 is a board mounting a circuit having both functions of detecting a liquid surface and detecting a state thereon. The liquid surface detecting function is a function of detecting a change in electric potential in the case where the liquid surface becomes lower than a predetermined height due to reduction of the electrolyte solution and the liquid surface detecting electrode 3d of the liquid surface sensor 3 is no longer immersed in the electrolyte solution, and the state detecting function is a function of comprehensively diagnosing a deteriorated state or a charged state of the lead acid battery on the basis of a change in battery voltage at a time of staring an engine or full-time detection of the lead acid battery voltage. Further, in the case of detecting the fact that the liquid surface of the electrolyte solution has become lower than the predetermined height on the basis of the liquid surface detecting function, or in the case where a result of diagnosis by the state detecting function coincides with a predetermined condition, an alarm is generated by an LED 4a or a buzzer 4b mounted to the top face of the substrate. Further, a switch 4c turning on and off the electric power supply of the circuit for the liquid surface detecting function or the state detecting function is also mounted to the board top face of the electronic circuit board 4.

It is possible to control the LED 4a or the buzzer 4b by the electronic circuit board 4 under an appropriate condition. For example, in the case of the liquid surface detecting function, there is a case in which the liquid surface of the electrolyte solution goes up and down due to vibration or the like. Accordingly, it is possible to control such that the LED 4a is not turned on or the buzzer 4b is not sounded in the case where the electric potential of the liquid surface detecting electrode 3d is only temporarily changed. Further, since it is possible to determine that the engine is under drive and a noise is loud by detecting the electric voltage between the terminals 5 and 6, for example, if the voltage is equal to or more than a predetermined voltage, the structure may be made so as to sound the buzzer 4b after the voltage becomes less than the predetermined voltage.

The recessed portion 2b is covered with a recessed portion lid 9 and is filled with a resin in an inner portion thereof. Accordingly, the electronic circuit board 4 is covered with the resin so as to be protected. Further, a weld portion between the liquid surface sensor connecting terminal 4d and the electric power supply connecting terminals 4e and 4f which are derived from the electronic circuit board 4, and the second raised terminal portion 8b or the sub terminals 5b and 6b is (are) covered with the resin so as to be protected. Further, the weld portion between the connecting terminal 3e of the liquid surface sensor 3 and the first raised terminal portion 8a is covered with a resin or a seal. These resins may be, for example, an epoxy resin, and the seal may be a material having an acid resistance, a water resistance, and a water repellant property to which an adhesive agent is attached, such as a caution label, for example, polypropylene (PP), polyethylene terephthalate (PET), and the like.

Further, since the lead acid battery in accordance with the present embodiment is provided with a reflow chamber for reflowing the electrolyte solution and a condensed solution of water vapor which leak out from the container 1 again into the container 1, a reflow space 2h is formed in the container lid 2. The reflow space 2h is a space to which a top portion partitioned by a number of partition walls in a rearward side of the recessed portion 2b in the depression 2e formed in the top face of the container lid 2 is open. Further, the reflow chamber is constructed by closing the opening portion of the reflow space 2h with a reflow chamber lid 10.

In accordance with the structure described above, since the liquid surface sensor connecting conductor 8 connecting the liquid surface sensor 3 with the electronic circuit board 4, and the terminal connecting conductors 5a and 6a connecting the positive and negative terminals 5 and 6 with the electronic circuit board 4 are insert-molded in the container lid 2, it is possible to prevent disconnection between the liquid surface sensor 3 and the electronic circuit board 4 and between the terminals 5 and 6 and the electronic circuit board 4, caused, e.g., by catching on an object on the top face of the container lid 2. Further, the outer appearance of the top face of the container lid is improved.

Further, since the liquid surface sensor connecting conductor 8 and the terminal connecting conductors 5a and 6a are embedded in the container lid 2 through insert molding, it is possible to prevent corrosion by the electrolyte solution even if the electrolyte solution is spotted on the top face of the container lid 2. Further, since both the raised terminal portions 8a and 8b and the sub terminals 5b and 6b exposing on the liquid surface sensor installation portion 2a and the recessed portion 2b, and their connecting portions are covered with the resin or the seal, it is possible to prevent the electrolyte solution from entering along an interface between the surfaces of the liquid surface sensor connecting conductor 8 and the terminal connecting conductors 5a and 6a and the resin of the container lid 2. Further, even if the electrolyte solution enters along the interface, since the annular projection 8d is formed in the rod-like intermediate conductor portion 8c of the liquid surface sensor connecting conductor 8, the annular projection 5c is formed in the terminal connecting conductor 5a, the annular projection is formed in the terminal connecting conductor 6a, and the distances of these interfaces are long, it is possible to delay the intrusion of the electrolyte solution so as to prevent progress of the corrosion.

Further, in the liquid surface sensor connecting conductor 8 and the terminal connecting conductors 5a and 6a, since both the raised terminal portions 8a and 8b and the sub terminals 5b and 6b are provided with the large diameter portions and the small diameter portions thereon, it is possible to fit the hole portion of the connecting terminal 3e of the liquid surface sensor 3 and the hole portions of the connecting terminals 4d to 4f of the electronic circuit board 4 to the small diameter portions so as to be locked on the large diameter portions, and it is possible to facilitate the welding work.

In this case, the structures of the terminal connecting conductors 5a and 6a shown in the embodiment described above is merely one example, and the shape and the material are not limited to the embodiment as far as the conductor which can be insert-molded in the resin. For example, in the embodiment described above, there is shown the case in which the terminal connecting conductors 5a and 6a are integrally formed with the positive and negative terminals 5 and 6; however, an independent component of these terminals 5 and 6 may be connected. Further, in the embodiment described above, there is shown the structure in which the terminal connecting conductors 5a and 6a are bent in the crank shape as shown in FIG. 3A or the like; however, they may be formed in a linear shape as shown in FIG. 3B. As shown in the embodiment described above, in the structure in which the terminal connecting conductors 5a and 6a are bent in the crank shape, it is possible to increase the distance of the interface by forming the annular projection 5c in the terminal connecting conductor 5a and forming the annular projection in the terminal connecting conductor 6a, and it is possible to delay the intrusion of the electrolyte solution so as to prevent the corrosion of the connecting portion with the connecting terminals 4d to 4f.

Further, the sub terminals 5b and 6b of the terminal connecting conductor 5a may be structured, as shown in FIG. 3B, such that only the small diameter portion is protruded upward from the bottom face of the recessed portion 2b and the electric power supply connecting terminal 4e is connected on the bottom face. However, in the structure described above, the connecting portion between the sub terminals 5b and 6b and the electric power supply connecting terminals 4e and 4f tends to be corroded in the case where the electrolyte solution enters along the interface of the terminal connecting conductor 5a. Accordingly, in the embodiment described above, as shown in FIG. 3A and the like, the structure is made such that the large diameter portions of the sub terminals 5b and 6b are protruded upward from the bottom face of the recessed portion 2b and the electric power supply connecting terminal 4e of the electronic circuit board 4 is connected so as to be away from the bottom face, while the annular groove 2f is formed in the periphery of the sub terminals 5b and 6b in the bottom face. Further, the recessed portion is filled with epoxy resin, whereby the epoxy resin not only covers the periphery of the large diameter portion of the sub terminals 5b and 6b but also enters the inner portion of the annular groove 2f so as to increase the distance of the interface with the sub terminals 5b and 6b. Further, since the epoxy resin has a good adhesive property with lead or the like, it is possible to prevent the electrolyte solution from further entering even if the electrolyte solution reaches the bottom face of the recessed portion 2b, whereby it is possible to securely prevent the corrosion of the connecting portion between the sub terminals 5b and 6b and the electric power supply connecting terminals 4e and 4f.

In the case where there is no risk that the electrolyte solution shall enter along the interface for a reason, e.g., of good adhesive property between the resin of the container lid 2 and the terminal connecting conductors 5a and 6a, the terminal connecting conductors 5a and 6a may be structured as shown in FIG. 3B, and the annular projection 5c of the terminal connecting conductor 5a and the annular projection of the terminal connecting conductor 6a are not necessarily formed. Further, the terminal connecting conductors 5a and 6a may be connected by welding or the like as an independent component of the positive and negative terminals 5 and 6. Further, the sub terminals 5b and 6b are not limited to be constituted by the large diameter portion and the small diameter portion, but may be constituted by a structure in which a mere connecting portion is only formed in the leading end portions of the terminal connecting conductors 5a and 6a. Further, it is preferred that the annular groove 2f formed in the bottom face of the recessed portion around the sub terminals 5b and 6b has an annular shape; however, it may be a groove having any shape, or may be formed so as to surround the periphery.

Further, in the embodiment described above, welding is used for connecting the connecting terminal 3e and the connecting terminals 4d to 4f to both the raised terminals 8a and 8b of the liquid surface sensor connecting conductor 8 and the sub terminals 5b and 6b of the terminal connecting conductors 5a and 6a; however, other connecting means such as brazing, soldering, caulking, and the like may also be used. For example, in the case where the liquid surface sensor connecting conductor 8 is made of brass, nickel silver, or the like, it becomes easy to perform connection by soldering.

Further, the structure of the liquid surface sensor 3 shown in the embodiment described above is merely one example. For example, the liquid surface detecting electrode 3d and the connecting terminal 3e are not necessarily formed integrally as far as they are connected in the internal portion; however, if the integrally formed structure is used, it is possible to eliminate a working step for connection. Further, in the embodiment described above, the liquid surface sensor 3 is manufactured by insert-molding the structure in which the liquid surface detecting electrode 3d and the connecting terminal 3e are connected in the resin; however, it may be manufactured in accordance with other methods than insert molding. Further, a lead wire or the like may be used for connecting with the liquid surface sensor connecting conductor 8 in the inner portion of the hole of the liquid surface sensor installation portion 2a, and it is possible to directly connect to the liquid surface detecting electrode 3d without using any connecting terminal 3e. Further, the liquid surface sensor 3 is not limited to the structure using the liquid surface detecting electrode 3d, but may be structured, for example, so as to detect the liquid surface of the electrolyte solution, e.g., by using an optical sensor. Any structure may be employed as far as it outputs the liquid surface state of the electrolyte solution as a signal such as an electric signal or the like.

Further, the installing structure between the liquid surface sensor 3 and the liquid surface sensor installation portion 2a is optional. The annular protruding body 3b is not necessarily used as far as it is possible to securely perform sealing, and the installing structure may be, for example, a screw and a packing. Further, if it is not particularly necessary to perform positioning at a time of installing the liquid surface sensor 3, the structures such as the positioning fitting portion 2c and the positioning fitting projection 3c are not necessary.

Further, the structure of the liquid surface sensor installation portion 2a shown in the embodiment described above is merely one example, and the hole having the shape shown in the figure is not necessarily provided. The structure may be made at least such that the through hole 2d having any shape is provided, and the liquid surface sensor 3 installed thereto can be connected to the liquid surface sensor connecting conductor 8 insert-molded in the container lid 2.

Further, in the embodiment described above, there is shown the case of detecting only the liquid surface of the electrolyte solution in one cell chamber by using one liquid surface sensor 3; however, the structure may be made so as to detect the liquid surface of the electrolyte solution in two or more cell chambers, by using two or more liquid surface sensors 3. Further, the structure may be made such that two or more liquid surface sensors 3 having different lengths of the liquid surface detecting electrodes 3d are installed to one cell chamber, whereby it is possible to detect the height of the liquid surface in a step-wise manner. In these cases, each of the liquid surface sensor 3, the electronic circuit board, and the like 4 are connected via different liquid surface sensor connecting conductors 8.

Further, the structure of the liquid surface sensor connecting conductor 8 shown in the embodiment described above is merely one example, and the shape and the material are not limited to those of the embodiment as far as the conductor can be insert-molded in the resin. For example, the rod-like intermediate conductor portion 8c is not limited to the straight rod shape, but may be bend in a crank shape or bent in a curved shape. Further, both the raised terminal portions 8a and 8b of the liquid surface sensor connecting conductor 8 are not limited to the structure constituted by the large diameter portion and the small diameter portion, but may be structured such that a mere connecting portion is only formed. Further, the liquid surface sensor connecting conductor 8 may be structured by connecting both the raised terminal portions 8a and 8b with the rod-like intermediate conductor portion 8c by welding or the like, or may be structured only by the rod-like intermediate conductor portion 8c. Further, the annular projection 8d is not necessarily formed in the rod-like intermediate conductor portion 8c.

Further, the structure of the recessed portion 2b shown in the embodiment described above is merely one example, but the shape and the structure are optional as far as the recessed portion is formed on the top face of the container lid 2. Further, it is optional whether or not the recessed portion 2b is covered with the recessed portion lid 9 or filled with resin.

Further, in the embodiment described above, there is shown the case in which the electronic circuit board 4 is structured so as to mount thereon the circuit having both the liquid surface detecting function and the state detecting function; however, the electronic circuit board 4 may be structured, for example, so as to mount thereon only the circuit with the liquid surface detecting function, or may be structured so as to mount thereon the circuit having the other function than the liquid surface detecting function. In the case of the electronic circuit board 4 having no liquid surface detecting function, it is not necessary to use the liquid surface sensor 3, and the liquid surface sensor installation portion 2a is not necessary. As a function which the electronic circuit board 4 can be provided with, there can be listed, for example, an antitheft function, a timer function of counting and informing the used period of the lead acid battery, and a function of detecting the other states of the lead acid battery than the deteriorated state and the charged state, in addition to the liquid surface detecting function and the state detecting function of detecting the deteriorated state and the charged state of the lead acid battery. Further, there is a case in which an electric component is provided appropriately in correspondence to the function, in some function provided in the electronic circuit board 4, as the liquid surface sensor 3 provided with respect to the liquid surface detecting function. In the embodiment, the liquid surface detecting function is combined with the state detecting function, but one function or more may be implemented on the electronic circuit board 4, and a plurality of functions may be combined.

In the case where the lead acid battery uses another electric component in place of the liquid surface sensor 3, it is preferable to connect between the electric component and the electronic circuit board 4 by using an electric component connecting conductor having the same structure as the liquid surface sensor connecting conductor 8. In this case, if there is a circumstance that the liquid surface sensor installation portion 2a or the electric component installation portion is adjacent to the recessed portion 2b and is integrally formed therewith, it is not always necessary to use the liquid sensor connecting conductor 8 or the electric component connecting conductor which is insert-molded in the container lid 2.

The liquid surface detecting function, the state detecting function, and the like of the electronic circuit board 4 may be mounted as one circuit provided with a plurality of functions, or may be mounted as a plurality of circuits which are independent of each other per the function, for example, sharing only the electric power supply circuit, the LED 4a, or the like. Further, for example, the structure may be made such that a microcomputer is mounted on the electronic circuit board 4 and a plurality of functions are achieved by a program operating on the microcomputer.

Further, in the embodiment described above, there is shown the case of using the electronic circuit board 4 on which the circuit is mounted on the board, however, the electronic circuit component is not necessarily mounted on the board as far as the electronic circuit component is provided with the circuit of the liquid surface detecting function or the like, but an electronic circuit component contained in a case and a plurality of circuit components including ICs which are wired by a lead or the like may be directly contained in the recessed portion 2b. Further, in the embodiment described above, there is shown the case in which the electronic circuit component issues alarms by using the LED 4a or the buzzer 4b; however, it is possible to use other light emitting means than the LED 4a and other sound producing means than the buzzer 4b may be used, or only any one of them may be used. The structure of the alarming means is optional as far as it issues alarms by any means that uses, e.g., a display. Further, the structure may be made such that an alarm may be issued outside on the basis of a wired or wireless signal from the electronic circuit component.

Further, the structure of the reflow chamber of the container lid 2 shown in the embodiment described above is merely one example, and any structure may be employed as far as it causes reflow of the electrolyte solution or condensed solution of water vapor which leaks out of the container 1 into the container 1. Further, the present invention can be similarly applied to a lead acid battery in which the reflow chamber is not provided in the container lid 2.

Further, in the embodiment described above, the description is given of the lead acid battery in which the inner portion of the container 1 is divided into a plurality of cell chambers; however, it is possible to be applied similarly to the lead acid battery having a single cell. Further, in the embodiment described above, the description is given of the liquid type lead acid battery; however, the structure is not limited to the liquid type, but may be set to a VRLA, a gel type, or the like.

Second Embodiment

Figure 4:
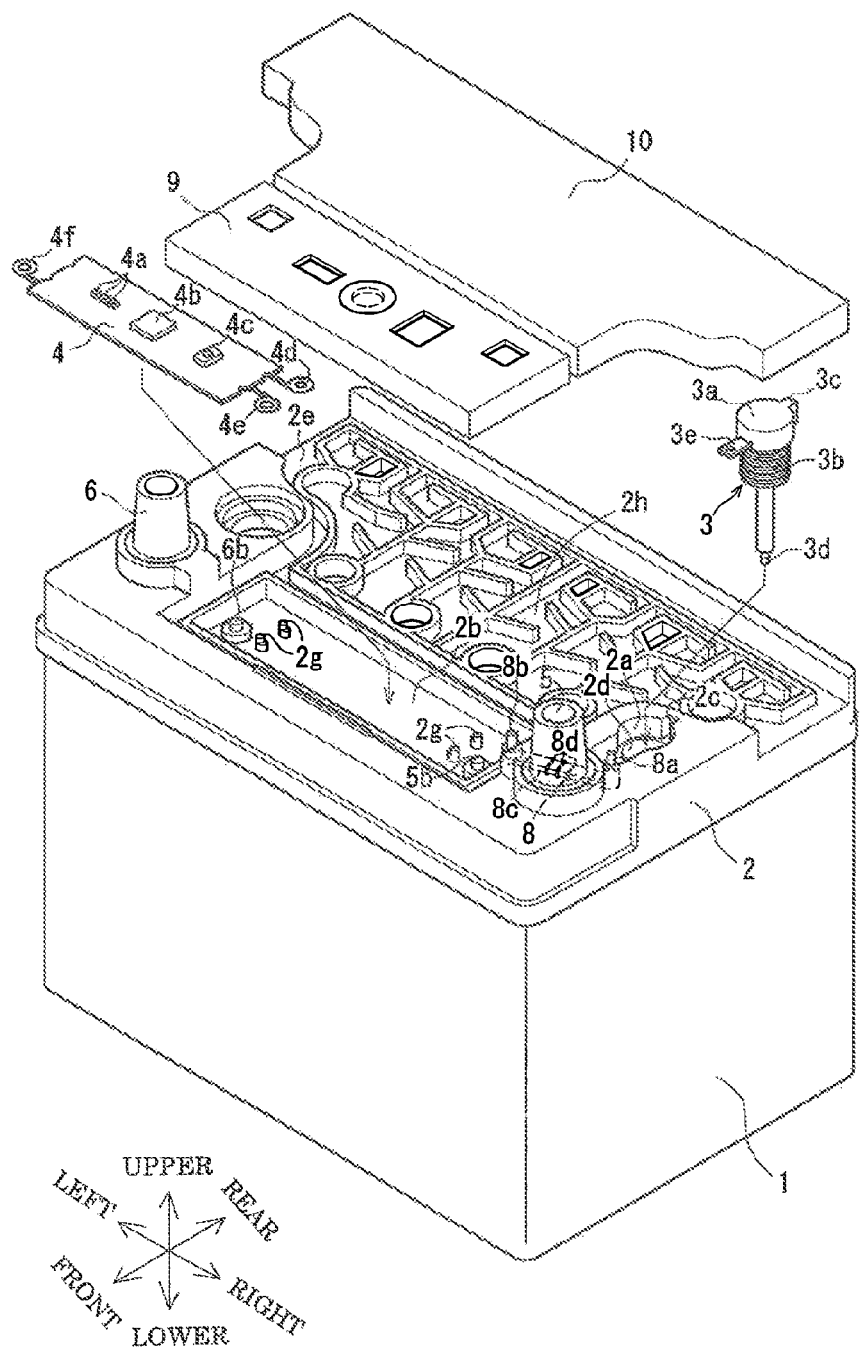
FIG. 4 shows a second embodiment in accordance with the present invention and is an exploded perspective view showing a structure of a lead acid battery.

A description will be given of a lead acid battery in accordance with the present embodiment mainly by paying attention to an electric component connecting conductor connecting an electric component with an electronic circuit component. The lead acid battery includes a container 1 made of a resin and having a rectangular vessel shape, and a container lid 2 closing and sealing a top end opening portion of the container 1 and made of a resin, as shown in FIG. 4. Since the internal structure of the container 1 is as described above, description thereof will not be given.

Since the container lid 2 is sealed and firmly attached to the top end opening portion of the container 1 by thermal welding or the like as described above, description thereof will not be given.

Since the liquid surface sensor installation portion 2a is formed on the top face of the container lid 2 as described above, description thereof will not be given.

Figure 5:
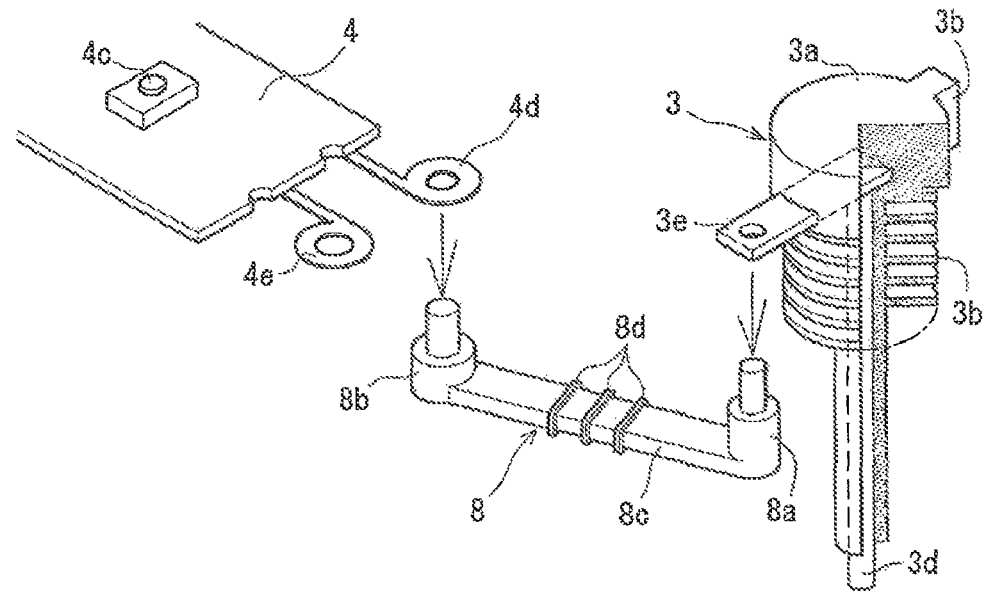
FIG. 5 shows the second embodiment in accordance with the present invention and is a partly enlarged perspective view showing a connecting portion between a liquid surface sensor and an electronic circuit board via a liquid surface sensor connecting conductor.

Since the liquid surface sensor 3 shown in FIGS. 4 and 5 is installed to the liquid surface sensor installation portion 2a as described above, description thereof will not be given.

Further, as shown in FIG. 4, since the recessed portion 2b for containing the electronic circuit board 4 is formed on the top face of the container lid 2 as described above, description thereof will not be given.

Since the liquid surface sensor connecting conductor 8 is shown in FIGS. 4 and 5 and its structure is as described above, description thereof will not be given.

Figure 6A:
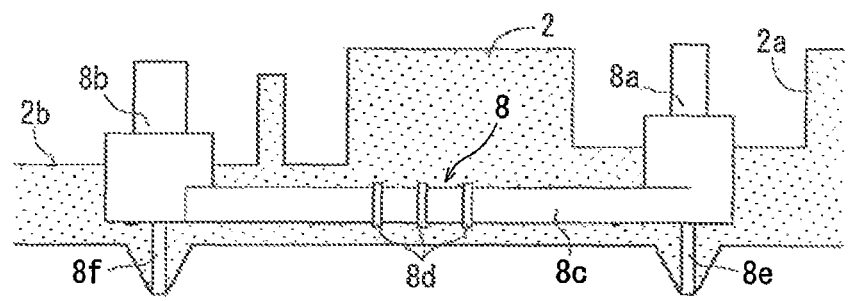
FIG. 6 shows the second embodiment in accordance with the present invention and is a longitudinal cross-sectional view showing a step of insert-molding the liquid surface sensor connecting conductor in a container lid.
Figure 6B:
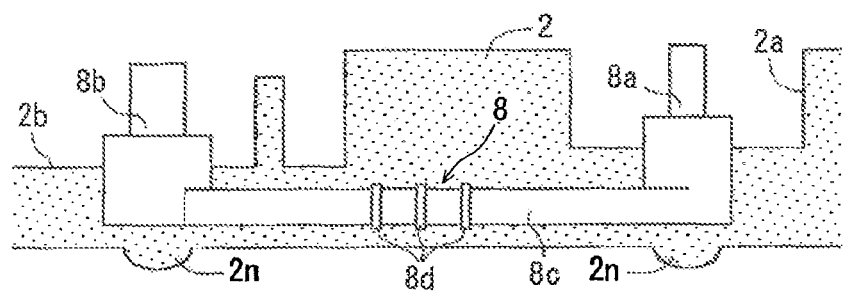

The liquid surface sensor connecting conductor 8 is insert-molded in the container lid 2. At this time, all of the small diameter portion of the first raised terminal portion 8a and the top portion of the large diameter portion are exposed to the forward portion of the bottom face of the hole of the liquid surface sensor installation portion 2a while being protruded therefrom, and all of the small diameter portion of the second raised terminal portion 8b and the top portion of the large diameter portion are exposed to a corner portion in the right rearward side of the bottom face of the recessed portion 2b while being protruded therefrom. The liquid surface sensor connecting conductor 8 employs a structure which is provided with an insert molding support bodies 8e and 8f each protruding downward from the lower faces of both the raised terminal portions 8a and 8b, as shown in FIG. 6A, and is structured such that the embedding position of the container lid 2 becomes accurate by insert-molding the insert molding support bodies 8e and 8f in a state of being supported by a metal mold. Further, a state covered with a resin 2n is achieved as shown in FIG. 6B by taking out the insert molding support bodies 8e and 8f from the back face side of the portion embedded with the liquid surface sensor connecting conductor 8 in the container lid 2 after the insert molding, and fitting and inserting a resin rod into a spaced portion after taking out the insert molding support bodies 8e and 8f in the back face of the container lid 2 so as to perform sealing while applying heat and pressure. Since the back face of the container lid 2 directly comes into contact with the electrolyte solution filled in the container 1, there is a risk that corrosion spreads therefrom if the spaced portion is kept exposed after the insert molding support bodies 8e and 8f are taken out; however, it is possible to prevent the corrosion by covering with the resin 2n.

The liquid surface sensor 3 is installed by inserting a tube body in which a liquid surface detecting electrode 3d is exposed at a lower portion thereof into a through hole 2d of the liquid surface sensor installation portion 2a, press fitting an annular protruding body 3b into the through hole 2d, and fitting a head portion 3a to the hole of the liquid surface sensor installation portion 2a, as shown in FIG. 4; however, since the installing method is as described above, description thereof will not be given.

In this case, since the annular protruding body 3b of the liquid surface sensor 3 is structured by arranging a number of thin discs so as to be spaced vertically, the protruding body 3b can be press fitted on the basis of flexibility of the thin resin discs even if the diameter of the discs is sufficiently larger than the diameter of the through hole 2d of the liquid surface sensor installation portion 2a. Further, even if a gap is generated between any disc and the through hole 2d, the other discs securely seal the hole. Accordingly, the electrolyte solution does not leak through the through hole 2d. On the other hand, on the assumption that the annular protruding body 3b is replaced by a simple cylinder body, it is impossible to sufficiently enlarge the diameter for enabling the press fitting. Accordingly, there is generated a risk that a gap is generated in a vertical direction and the electrolyte solution leaks therefrom, if any one of the cylinder body and the through hole $2d$ is deformed in an slightly oval shape. Further, on the assumption that the annular protruding body $3b$ is replaced by a male screw and the through hole $2d$ is replaced by a female screw, it is possible to prevent leakage of the electrolyte solution through screwing using a packing; however, since directions of the connecting terminals $3e$ are different from one another after being screwed while being rotated, it is necessary to connect to the first raised terminal portion $8a$ by using a lead wire or the like.

The electronic circuit board 4 is locked to four supporting raised bodies $2g$ at four positions protruding from the bottom face of the recessed portion $2b$ so as to be contained, as shown in FIG. 4. Further, as shown in FIGS. 4 and 5, the liquid surface sensor connecting terminal $4d$ is connected by welding by fitting the hole portion of the liquid surface sensor connecting terminal $4d$ derived from the electronic circuit board 4 to the small diameter portion of the second raised terminal portion $8b$ of the liquid surface sensor connecting conductor 8 so as to be locked on the large diameter portion, and heating and welding the small diameter portion of the second raised terminal portion $8b$ from above. Accordingly, the electronic circuit board 4 is connected to the liquid surface detecting electrode $3d$ of the liquid surface sensor 3 via the liquid surface sensor connecting conductor 8. Further, as shown in FIG. 4, the electric power supply connecting terminals $4e$ and $4f$ derived from the electronic circuit board 4 are connected by welding to the positive and negative sub terminals $5b$ and $6b$ protruding at both right and left end portions of the bottom face of the recessed portion $2b$, in the same manner. Since the sub terminals $5b$ and $6b$ are respectively connected to the positive and negative terminals 5 and 6 inside the container lid 2, the electronic circuit board 4 can be fed with electric power from the lead acid battery.

Since the electronic circuit board 4 is a substrate mounting thereon a circuit having both the functions of detecting the liquid surface and detecting the state as described above, description thereof will not be given.

Since the control of the LED $4a$ and the buzzer $4b$ by the electronic circuit board 4 is as described above, description thereof will not be given.

Since the recessed portion $2b$ is covered with the recessed portion lid 9 and is filled with resin in its inner portion as described above, description thereof will not be given.

Further, since the lead acid battery in accordance with the present embodiment is provided with a reflow chamber for reflowing the electrolyte solution and condensed solution of water vapor which leak out of the container 1 again into the container 1 as described above, description thereof will not be given.

In accordance with the structure described above, since the liquid surface sensor connecting conductor 8 connecting the liquid surface sensor 3 with the electronic circuit board 4 is insert-molded in the container lid 2, it is possible to prevent disconnection between the liquid surface sensor 3 and the electronic circuit board 4, e.g., due to the liquid surface sensor connecting conductor 8 catching on an object on the top face of the container lid 2. Further, the outer appearance of the top face of the container lid is improved.

Further, since the liquid surface sensor connecting conductor 8 is embedded in the container lid 2 by insert molding, it is possible to prevent corrosion by the electrolyte solution even if the electrolyte solution is spotted on the top face of the container lid 2. Further, since both the raised terminal portions $8a$ and $8b$ exposed on the liquid surface sensor installation portion $2a$ and the recessed portion $2b$ and the connecting portions thereof are covered by a resin or a seal, it is possible to prevent the electrolyte solution from entering along the interface between the surface of the liquid surface sensor connecting conductor 8 and the resin of the container lid 2. Further, even if the electrolyte solution enters along the interface, it is possible to delay the intrusion of the electrolyte solution so as to prevent the progress of corrosion, because the annular projection $8d$ is formed in the rod-like intermediate conductor portion $8c$ of the liquid surface sensor connecting conductor 8 and the distance of the interface is made long.

Further, in the liquid surface sensor connecting conductor 8, since both the raised terminal portions $8a$ and $8b$ connected via the rod-like intermediate conductor portion $8c$ are provided with the large diameter portion and the small diameter portion existing thereon, it is possible to fit the hole portion of the connecting terminal $3e$ of the liquid surface sensor 3 and the hole portion of the liquid surface sensor connecting terminal $4d$ of the electronic circuit board 4 to the small diameter portion so as to be locked on the large diameter portion, and it is possible to facilitate the welding work.

In this case, the structure of the liquid surface sensor connecting conductor 8 shown in the above embodiment is merely one example, and the shape and the material are not limited to the embodiment as far as the conductor can be insert-molded in the resin. For example, the rod-like intermediate conductor portion $8c$ is not limited to the straight rod shape, but may be formed as a shape bent in a crank shape or a shape bent in a curved shape. Further, both the raised terminal portions $8a$ and $8b$ of the liquid surface sensor connecting conductor 8 are not limited to be constituted by the large diameter portion and the small diameter portion, but may be structured such that a mere connecting portion is only formed. Further, the liquid surface sensor connecting conductor 8 may be structured by connecting both the raised terminal portions $8a$ and $8b$ with the rod-like intermediate conductor portion $8c$ by welding or the like, or may be structured only by the rod-like intermediate conductor portion $8c$. Further, the annular projection $8d$ is not necessarily formed in the rod-like intermediate conductor portion $8c$.

Further, in the embodiment described above, the welding is used at a time of connecting the connecting terminal $3e$ and the liquid surface sensor connecting terminal $4d$ to both the raised terminal portions $8a$ and $8b$ of the liquid surface sensor connecting conductor 8; however, another connecting means as described above may be used.

Further, the structure of the recessed portion $2b$ shown in the embodiment described above is one example as described above.

Further, in the embodiment described above, there is shown the case in which the electronic circuit board 4 is connected to the positive and negative terminals 5 and 6 inside the container lid 2 via the electric power supply connecting terminals $4e$ and $4f$ and the sub terminals $5b$ and $6b$; however, the electric power supply feeding means to the electronic circuit board 4 is optional, and may be structured, for example, so as to be fed with electric power from, e.g., a separate battery installed to the external portion or the lead acid battery.

Further, in the embodiment described above, there is shown the case in which the electronic circuit board 4 is structured so as to mount thereon a circuit having both the liquid surface detecting function and the state detecting function; however, the electronic circuit board 4 has other functions as described above. In this case, there is a case in which an electric component is provided appropriately in correspondence to a function provided in the electronic circuit board 4 as the liquid surface sensor 3 provided with respect to the liquid surface detecting function, and there is a case in which an appropriate sensor or the like is provided in the lead acid battery or a fixture thereof.

In the case where the lead acid battery uses another electric component in place of the liquid surface sensor 3, the electric component and the electronic circuit board 4 may be connected by using an electric component connecting conductor having the same structure as the liquid surface sensor connecting conductor 8.

Since the liquid surface detecting function, the state detecting function, and the like of the electronic circuit board 4 may be implemented as one circuit having a plurality of functions as described above, description thereof will not be given.

Further, in the embodiment described above, there is shown the case of using the electronic circuit board 4 in which a circuit is mounted on the board; however, the mode thereof is as described above. Further, in the embodiment described above, there is shown the case in which an alarm is issued by the LED 4a or the buzzer 4b; however, the mode thereof is as described above.

Further, the structure of the liquid surface sensor 3 shown in the embodiment described above is merely one example. For example, the liquid surface detecting electrode 3d and the connecting terminal 3e are not necessarily formed integrally as far as they are connected in the inner portion, however, it is possible to eliminate a working step for connecting by using the integrally formed structure. Further, the lead wire or the like may be used for connecting to the liquid surface sensor connecting conductor 8 in the inner portion of the hole of the liquid surface sensor installation portion 2a, and it is possible to directly connect to the liquid surface detecting electrode 3d without using the connecting terminal 3e. Further, the liquid surface sensor 3 is not limited to the structure using the liquid surface detecting electrode 3d, but may be structured, for example, so as to detect the liquid surface of the electrolyte solution by using an optical sensor, and whatever structure can be employed as far as it outputs the liquid surface state of the electrolyte solution as a signal such as an electric signal or the like.

Further, the installing structure between the liquid surface sensor 3 and the liquid surface sensor installation portion 2a is optional, does not necessarily use the annular protruding body 3b as far as it can perform secure sealing, and may use, for example, a screw and a packing. Further, the positioning at a time of installing the liquid surface sensor 3 is not limited to the case of fitting the positioning fitting portion 2c and the positioning fitting projection 3c, for example, the head portion 3a of the liquid surface sensor 3 may be formed as another shape than the circular shape, and the hole of the liquid surface sensor installation portion 2a may be formed in such a shape that the head portion 3a is fitted only in a specific direction. Further, if it is not particularly necessary to perform positioning at a time of installing the liquid surface sensor 3, the positioning fitting means is not necessary.

Further, the structure of the liquid surface sensor installation portion 2a shown in the embodiment is merely one example, is not necessarily provided with the hole having the shape shown in the figure, and may be structured such that at least the through hole 2d having any shape is provided, and the liquid surface sensor 3 installed thereto can be connected to the liquid surface sensor connecting conductor 8 insert-molded in the container lid 2.

Further, in the embodiment described above, there is shown the case of detecting only the liquid surface of the electrolyte solution in one cell chamber by using one liquid surface sensor 3; however, using two or more liquid surface sensors 3 and the like is as described above.

Further, the structure of the reflow chamber of the container lid 2 shown in the embodiment is merely one example as described above.

Further, in the embodiment described above, the description is given of the lead acid battery in which the internal portion of the container 1 is divided into a plurality of cell chambers; however, the lead acid battery of a single cell can be implemented likewise. Further, in the embodiment described above, the description is given of the liquid type lead acid battery; however, other storage batteries such as a nickel cadmium battery may be implemented likewise as far as a liquid type storage battery in which an electrolyte solution having fluidity is filled in the container 1.

Third Embodiment

Figure 7:
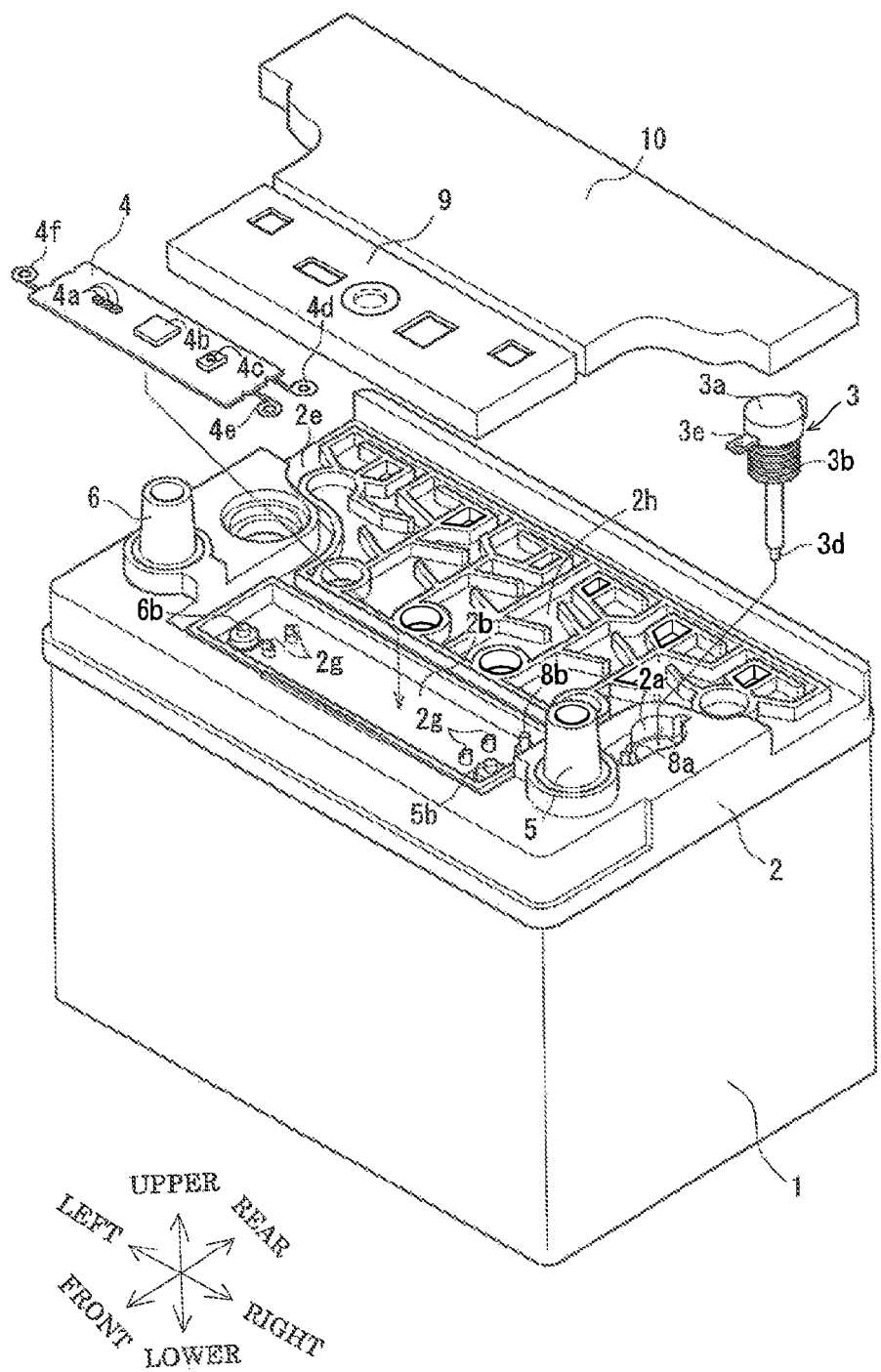
FIG. 7 shows a third embodiment in accordance with the present invention and is an exploded perspective view showing a structure of a lead acid battery.

A description will be given of a lead acid battery in accordance with the present embodiment mainly by paying attention to a supporting raised body arranging an electronic circuit component in a recessed portion. The lead acid battery includes a container 1 made of a resin and having a rectangular vessel shape, and a container lid 2 closing and sealing a top end opening portion of the container 1 and made of a resin, as shown in FIG. 7. Since the internal structure of the container 1 is as described above, description thereof will not be given.

Since the container lid 2 is sealed and firmly attached to the top end opening portion of the container 1 by thermal welding or the like and the positive and negative terminals 5 and 6 made of lead or the like are insert-molded as described above, description thereof will not be given.

Since the liquid surface sensor installation portion 2a is formed on the top face of the container lid 2 as described above, description thereof will not be given.

Since the liquid surface sensor 3 is installed to the liquid surface sensor installation portion 2a as described above, description thereof will not be given.

Further, a recessed portion 2b for containing the electronic circuit board 4 is formed on the top face of the container lid 2. The recessed portion 2b is a recessed portion surrounding a forward portion of the depression 2e formed on the top face of the container lid 2 with a rectangular partition wall, and the electronic circuit board 4 is contained while being supported to the supporting raised bodies 2g formed at four positions of the bottom face. Further, the top portion of the second raised terminal portion 8b of the liquid surface sensor connecting conductor is protruded to a corner portion in the right rearward side of the bottom face of the recessed portion 2b, and the top portions of the sub terminals 5b and 6b of the terminal connecting conductors 5a and 6a described below are protruded at left and right end portions of the bottom face.

The liquid surface sensor connecting conductor is the connecting conductor made of lead or the like, and is structured by integrally connecting the first raised terminal portion 8a and the second raised terminal portion 8b by a rod-like intermediate conductor portion (not shown); however, since its structure is as described above, description thereof will not be given.

The liquid surface sensor 3 is installed by inserting a tube body in which a liquid surface detecting electrode 3d is exposed at a lower portion thereof to a through hole of the liquid surface sensor installation portion 2a, press fitting an annular protruding body 3b to the through hole, and fitting a head portion 3a to the hole of the liquid surface sensor installation portion 2a, as shown in FIG. 7; however, since an installing method is as described above, description thereof will not be given.

Figure 8:
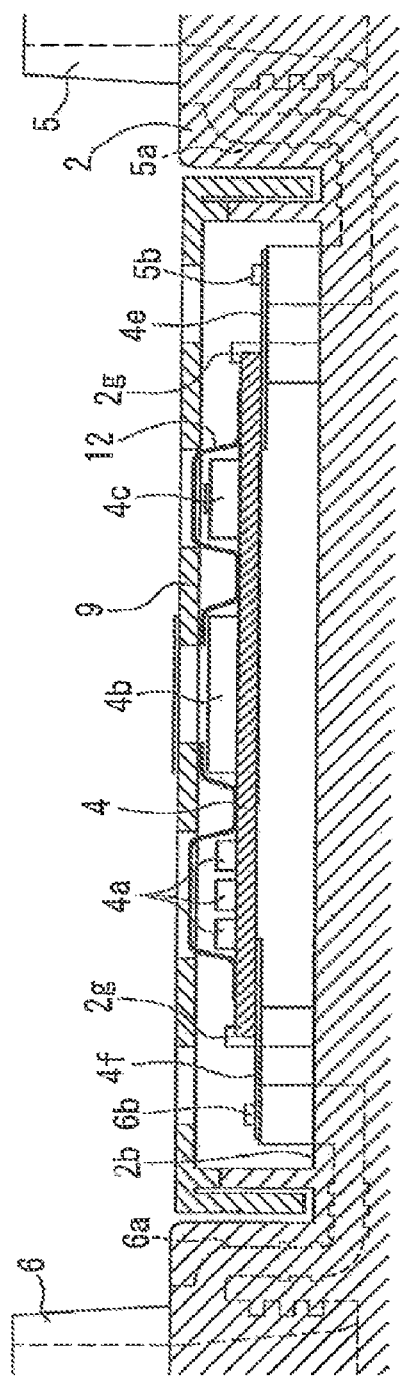
FIG. 8 shows the third embodiment in accordance with the present invention and is a partly enlarged longitudinal cross-sectional view showing a liquid surface detecting circuit board contained in a recessed portion of a container lid.

The terminal connecting conductors 5a and 6a are connecting conductor portions derived from the positive and negative terminals 5 and 6 and made of lead or the like, as shown in FIG. 8, and are provided with the sub terminals 5b and 6b at the leading end portions. The sub terminals 5b and 6b are terminal portions for connecting to the electronic circuit board 4, and are constituted by the large diameter portions to be the leading end portions of the terminal connecting conductors 5a and 6a, and the small diameter portions existing on the large diameter portions and being smaller than the large diameter portions. Further, the terminal connecting conductors 5a and 6a are derived from the intermediate portions of the terminals 5 and 6 so as to hang to a predetermined lower position, and are thereafter drawn out in a horizontal direction, thereby being bent in a crank shape so as to reach the sub terminals 5b and 6b. The terminal connecting conductors 5a and 6a are integrally molded by lead casting together with the terminals 5 and 6. Further, the terminal connecting conductors 5a and 6a are insert-molded in the container lid 2 together with the terminals 5 and 6. At this time, all of the small diameter portions of the sub terminals 5b and 6b and the top portion of the large diameter portions are exposed while being protruded from the bottom face of the recessed portion 2b. Accordingly, the sub terminals 5b and 6b protrude to such positions that the small diameter portions are away from the bottom face of the recessed portion 2b in an upward direction.

Since the electronic circuit board 4 is a substrate mounting thereon the circuit having both the functions of detecting the liquid surface and detecting the state as described above, description thereof will not be given.

Since the control of the LED 4a and the buzzer 4b by the electronic circuit board 4 is as described above, description thereof will not be given.

Figure 15:
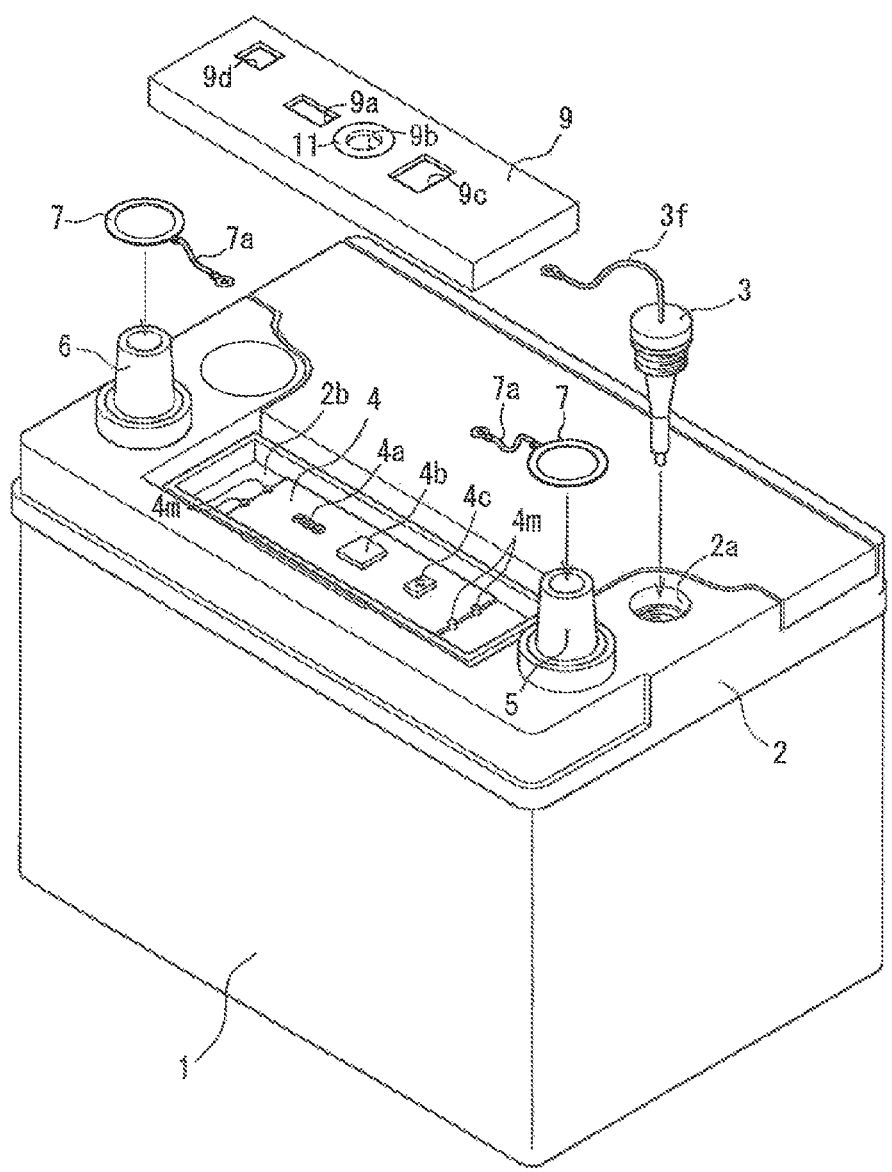
FIG. 15 shows a conventional example, and is an exploded perspective view showing a structure of a lead acid battery.

The electronic circuit board 4 is supported by the supporting raised bodies 2g at the four positions so as to be contained in the recessed portion 2b. In this case, since conventional positioning raised body 2m shown in FIG. 15 is structured only by protruding a columnar projection from the bottom face of the recessed portion 2b, the electronic circuit board 4 is mounted directly on the bottom face of the recessed portion 2b through engagement with semicircular cutouts formed in the right and left board end surfaces of the electronic circuit board 4 so as to be positioned thereto. On the other hand, the supporting raised body 2g in accordance with the present embodiment is structured, as shown in FIGS. 7 and 8, such that an elliptic cylindrical projection is provided in a lower portion of a similarly columnar projection to the positioning raised body 2m, and the electronic circuit board 4 is locked on the elliptic cylinder in the lower portion by engaging the semicircular cutouts formed in the right and left board end surfaces with the cylinder in the top portion of the supporting raised body 2g. Accordingly, the electronic circuit board 4 is disposed in a floating state at a position which is upwardly away from the bottom face of the recessed portion 2b, and a sufficient gap is generated between the bottom face and the lower face of the board.

The electronic circuit board 4 is contained in the recessed portion 2b as described above, and since the details thereof are as described above, description thereof will not be given.

Since the recessed portion 2b is covered with the recessed portion lid 9 and is filled with resin in the inner portion as described above, description thereof will not be given.

Further, since the lead acid battery in accordance with the present embodiment is provided with a reflow chamber for reflowing the electrolyte solution and condensed solution of water vapor which leak out of the container 1 again into the container 1 as described above, description thereof will not be given.

In accordance with the structure described above, since the electronic circuit board 4 is supported to the supporting raised bodies 2g, the electronic circuit board 4 can be disposed so as to be upwardly away from the bottom face of the recessed portion 2b. Further, it is possible to arrange the weld portion between the liquid surface sensor connecting terminal 4d derived from the electronic circuit board 4 and the second raised terminal portion 8b and the weld portions between the electric power supply connecting terminals 4e and 4f and the sub terminals 5b and 6b so as to be upwardly away from the bottom face of the recessed portion 2b. Further, a sealing agent can be filled in the recessed portion 2b and can make the agent go around the lower face of the electronic circuit board 4. Accordingly, even if water or the electrolyte solution enters the bottom face of the recessed portion 2b, it is possible to securely prevent corrosion of the electronic circuit board 4 and its components.

Particularly, since the top portions of the sub terminals 5b and 6b connected to the positive and negative terminals 5 and 6 via the terminal connecting conductors 5a and 6a protrude on the bottom face of the recessed portion 2b, there is a risk that the electrolyte solution within the cell chamber of the container 1 enters along the interface with the resin of the insert-molded container lid 2; however, it is possible to securely prevent corrosion of the electronic circuit board 4 or the like by the electrolyte solution described above.

Further, if the sealing agent filled in the recessed portion 2b employs an epoxy resin having a good adhesive property with lead or the like of the second raised terminal portion 8b or the sub terminals 5b and 6b, it is possible to prevent the electrolyte solution from entering along the interface between the epoxy resin and the large diameter portions of the second raised terminal portion 8b and the sub terminals 5b and 6b. Accordingly, it is possible to more securely prevent corrosion of the electronic circuit board 4 or the like.

In this case, the structure of the supporting raised body 2g shown in the embodiment described above is merely one example, and the shape and the material are not limited to the embodiment as far as the structure supports the electronic circuit board 4 and disposes the board so as to be away from the bottom face of the recessed portion 2b. Further, in the embodiment described above, there is shown the case in which the supporting raised bodies 2g are integrally formed together with the container lid 2; however, a separate supporting raised body 2g may be attached to the bottom face of the recessed portion 2b.

Further, the structure of the recessed portion 2b shown in the embodiment is one example as described above.

Further, the structure of the liquid surface sensor 3 shown in the embodiment is one example as described above.

Further, the installing structure between the liquid surface sensor 3 and the liquid surface sensor installation portion 2a is optional as described above.

Further, the structure of the liquid surface sensor installation portion 2a shown in the embodiment is one example as described above.

Further, in the embodiment described above, there is shown the case of detecting only the liquid surface of the electrolyte solution in one cell chamber by using one liquid surface sensor 3; however, using two or more liquid surface sensors 3 and the like is as described above.

Further, in the embodiment described above, there is shown the case in which the electronic circuit board 4 is structured so as to mount a circuit having both the liquid surface detecting function and the state detecting function thereon; however, the electronic circuit board 4 has other functions as described above.

Since the liquid surface detecting function, the state detecting function, and the like of the electronic circuit board 4 may be implemented as one circuit having a plurality of functions as described above, description thereof will not be given.

Further, in the embodiment described above, there is shown the case of using the electronic circuit board 4 in which a circuit is mounted on the board; however, the mode thereof is as described above. Further, in the embodiment described above, there is shown the case that the electronic circuit issues alarms by the LED 4a or the buzzer 4b; however, the mode thereof is as described above.

Further, in the embodiment described above, there is shown the case of using the liquid surface sensor connecting conductor and the terminal connecting conductors 5a and 6a insert-molded in the container lid 2, in order to connect the liquid surface sensor 3 and the positive and negative terminals 5 and 6 to the electronic circuit board 4; however, these connecting structures are not particularly limited, but they may be connected, for example, by a wire applied to the top face of the container lid 2. Further, in the embodiment described above, welding is used at a time of connecting the connecting terminal 3e and the connecting terminals 4d to 4f to both the raised terminal portions 8a and 8b and the sub terminals 5b and 6b of the liquid surface sensor connecting conductor; however, other connecting means such as brazing, soldering, caulking, and the like may also be used.

Further, the structure of the reflow chamber of the container lid 2 shown in the embodiment described above is merely one example as described above.

Further, in the embodiment described above, the description is given of the lead acid battery in which the inner portion of the container 1 is divided into a plurality of cell chambers; however, it is possible to be applied similarly to the lead acid battery having a single cell. Further, in the embodiment described above, the description is given of the liquid type lead acid battery; however, the structure is not limited to the liquid type, but may be of a VRLA, a gel type, or the like.

Fourth Embodiment

Figure 9:
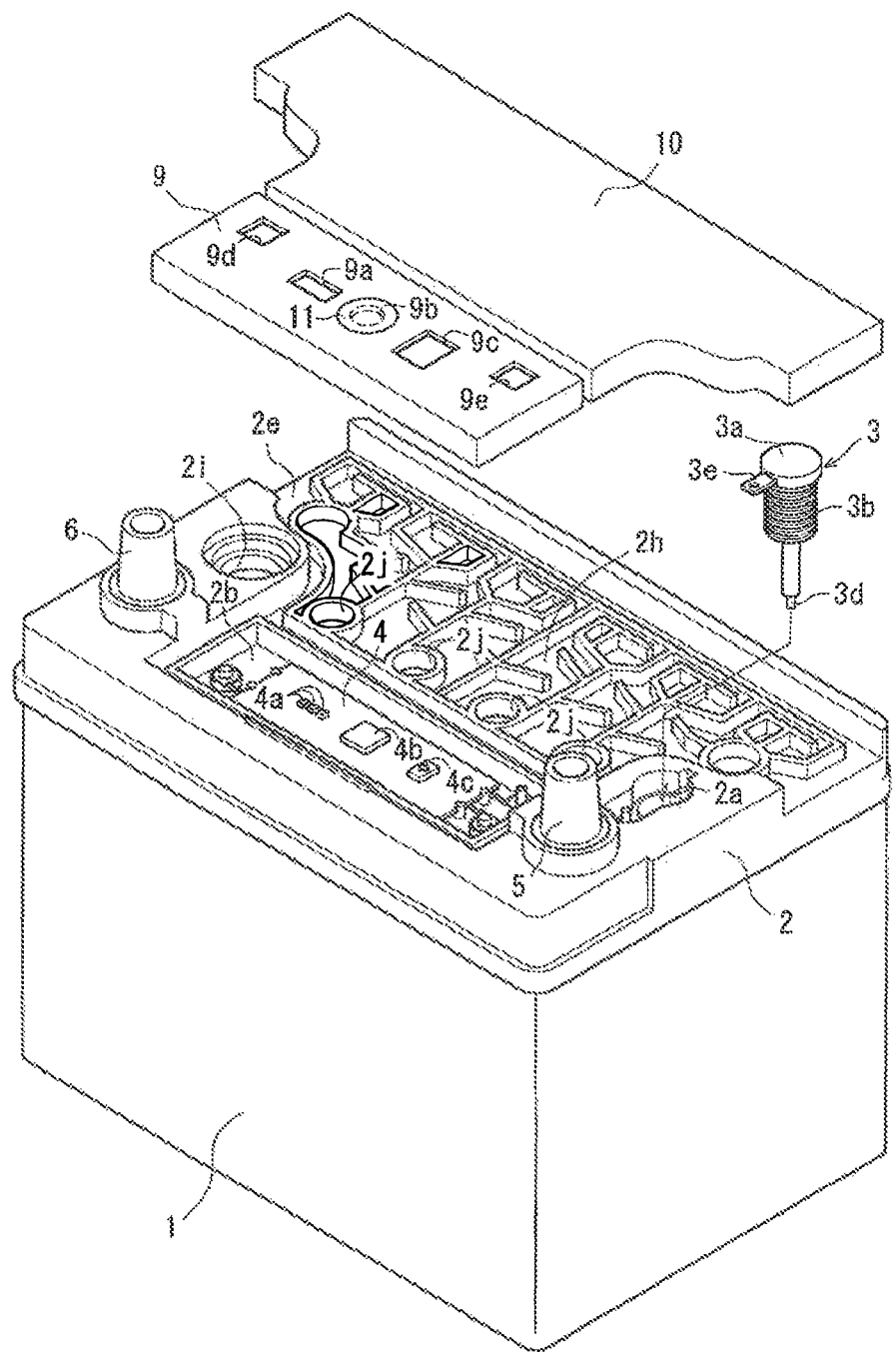
FIG. 9 shows a fourth embodiment in accordance with the present invention and is an exploded perspective view showing a structure of a lead acid battery.

A description will be given of a lead acid battery in accordance with the present embodiment mainly by paying attention to a recessed portion lid in which two filling opening portions are formed. The lead acid battery includes a container 1 made of a resin and having a rectangular vessel shape, and a container lid 2 closing and sealing a top end opening portion of the container 1 and made of a resin, as shown in FIG. 9; however, since the internal structure of the container 1 is as described above, description thereof will not be given.

Since the container lid 2 is sealed and firmly attached to the top end opening portion of the container 1 by thermal welding or the like as described above, description thereof will not be given.

The liquid surface sensor installation portion 2a is formed on the top face of the container lid 2. The liquid surface sensor installation portion 2a is a hole formed on the top face of the container lid 2, and the bottom face of the hole forms a through hole communicating with the container 1, and since the liquid surface sensor 3 is as described above, description thereof will not be given.

Further, the recessed portion 2b for containing the electronic circuit board 4 is formed in the top face of the container lid 2. The recessed portion 2b is a recessed portion surrounding a portion of the depression 2e formed on the top face of the container lid 2 with a rectangular partition wall, and the electronic circuit board 4 is contained in the inner portion. Since the details of the electronic circuit board 4 are as described above, description thereof will not be given.

The electronic circuit board 4 is structured so as to be connected to the positive and negative terminals 5 and 6 via the connecting conductor embedded in the container lid 2 and be also connected to the connecting terminal 3e of the liquid surface sensor 3. Further, the liquid surface detecting circuit of the electronic circuit board 4 is fed with electric power through the positive and negative terminals 5 and 6, occasionally monitors the electric potential of the liquid surface detecting electrode 3d of the liquid surface sensor 3, and is structured so as to issue alarms by the LED 4a or the buzzer 4b when the electric potential becomes equal to or less than a predetermined value, so as to warn that the liquid surface of the electrolyte solution becomes lower than the predetermined height. Further, the state detecting circuit of the electronic circuit board 4 is fed with electric power through the positive and negative terminals 5 and 6, monitors an electric voltage between the terminals 5 and 6, and is structured so as to issue alarms by the LED 4a or the buzzer 4b in the case where a change or a value of the electric voltage coincides with a predetermined value, so as to warn of a deteriorated state or a charged state of the lead acid battery.

Since the control of the LED 4a or the buzzer 4b by the electronic circuit board 4 is as described above, description thereof will not be given.

The recessed portion 2b is covered with the recessed portion lid 9. The recessed portion lid 9 is a lid member having an inverted rectangular bowl shape and made of a resin, is provided one opening window 9a for viewing a lighting state of the LED 4a of the electronic circuit board 4 from above, one opening window 9b for propagating upward a buzzer sound of the buzzer 4b, and one opening window 9c for operating the switch 4c from above, and is provided with two filling opening portions 9d and 9e for filling the recessed portion 2b with resin. Further, the opening window 9b for propagating the buzzer sound of the buzzer 4b is closed at its opening portion by a filter 11 made of a porous sheet. Further, a transparent resin cover 12 made of a transparent polyurethane film is disposed on the board top face of the electronic circuit board 4, as shown in FIG. 8, such that the LED 4a and the switch 4c are covered by a raised portion of the transparent resin cover 12. The porous sheet of the filter 11 is structured by forming a material having a water repellant property into a porous sheet shape, and employs a structure constituted by a polypropylene (PP) and a filler herein. It is a sheet member easily passing the buzzer sound of the buzzer 4b because the air passes the sound. Since the transparent resin cover 12 is structured so as to visually observe the lighting state of the LED 4a and operate the switch 4c from the outside, by forming transparent polyurethane into a film shape having flexibility.

Further, since the lead acid battery in accordance with the present embodiment is provided with a reflow chamber for reflowing the electrolyte solution and condensed solution of water vapor which leak out of the container 1 again into the container 1 as described above, description thereof will not be given.

A description will be given of a manufacturing method of the lead acid battery described above. The electronic circuit board 4 is contained in the recessed portion 2b of the container lid 2 before being attached to the container 1, and they are connected to the connecting conductor. In this case, it is possible to firmly attach the container lid 2 to the container 1 before containing the electronic circuit board 4, but it is preferred in the light of the work process to contain the board before attaching the lid to the container 1.

The recessed portion 2b containing the electronic circuit board 4 is covered with the recessed portion lid 9, and an epoxy resin is filled in the recessed portion 2b from one filling opening portion 9d of the recessed portion lid 9. Then, since the air is smoothly discharged from the one filling opening portion 9e within the recessed portion 2b, the epoxy resin injected from the one filling opening portion 9d quickly enters the recessed portion 2b so as to securely reach the back. Further, it is possible to further rapidly fill the epoxy resin by forcibly discharging the air from the other filling opening portion 9e. In this case, it is preferred to fill the epoxy resin so as to securely cover the electronic circuit board 4, but it is not necessary for the resin to be completely filled up to an inside ceiling surface of the recessed portion lid 9, and the epoxy resin is filled in such a manner as not to cover the top portion of the raised portion of the transparent resin cover 12 and the top surface of the buzzer 4b. It is possible to protect the electronic circuit board 4 and the connecting portions thereof by curing the epoxy resin filled as described above at a room temperature or a little raised temperature.

The container lid 2 is sealed and firmly attached to the top end opening portion of the container 1. Further, the electrolyte solution is poured into each of the cell chambers of the container 1 from a liquid pouring port 2i which is opened on the top face of the container lid 2, a plurality of liquid pouring ports 2j which are opened in the reflow space 2h, and a through hole of the liquid surface sensor installation portion 2a. In the case where the electrolyte solution can be poured into all the cell chambers from the plurality of liquid pouring ports 2j which are opened in the reflow space 2h, it is not necessary to form the liquid pouring port 2i on the top face of the container lid 2, and it is also not necessary to utilize the through hole of the liquid surface sensor installation portion 2a for pouring the liquid. In this case, since the lead acid battery is not yet subjected to forming even if the pouring of the electrolyte solution is finished, the switch 4c of the electronic circuit board 4 is previously turned off.

When the pouring of the electrolyte solution is finished, the connection to the connecting conductor is carried out by installing the liquid surface sensor 3 to the liquid surface sensor installation portion 2a of the container lid 2. Further, the reflow space 2h in the container lid 2 is covered with the reflow chamber lid 10 and is sealed and firmly attached by thermal welding or the like, before or after installing the liquid surface sensor 3. Further, the liquid pouring port 2i which is opened on the top face of the container lid 2 is plugged and closed, at a suitable timing after finishing the pouring of the electrolyte solution. In the case where the through hole of the liquid surface sensor installation portion 2a is not utilized for pouring the electrolyte solution, the liquid surface sensor 3 may be installed to the liquid surface sensor installation portion 2a previously.

In accordance with the structure described above, since the epoxy resin can be filled from the one filling opening portion 9d and the air within the recessed portion 2b can be discharged from the other filling opening portion 9e, it is possible to sufficiently fill the resin up to the back of the recessed portion 2b so as to securely cover the electronic circuit board 4, and it is possible to protect the mounted components, the connected portions, and the like from the electrolyte solution and other kinds of moisture, dust, external force, and the like.

Figure 10:
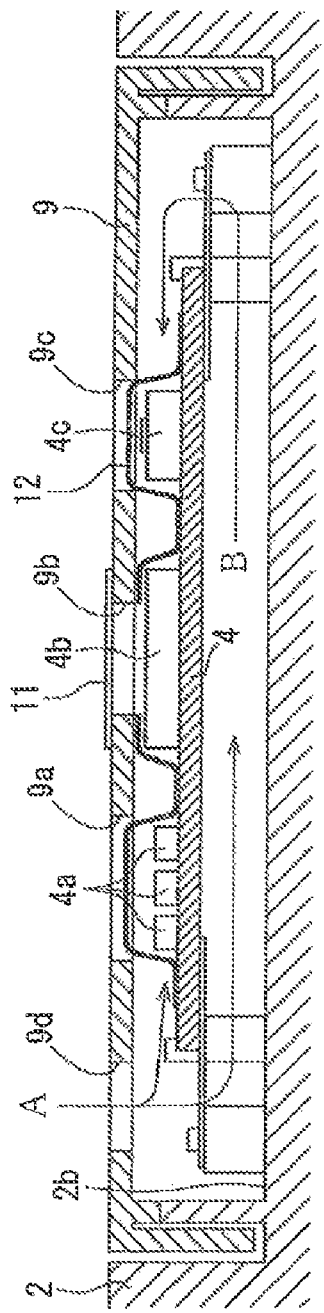
FIG. 10 shows the fourth embodiment in accordance with the present invention and is a partly enlarged longitudinal cross-sectional view showing a step of filling a resin in a recessed portion in the case of using a conventional recessed portion lid.

In other words, as shown in FIG. 10, in the case of the conventional lead acid battery having merely one filling opening portion 9d of the recessed portion lid 9, the epoxy resin filled from the filling opening portion 9d is going to spread as shown by arrows A and B; however, since the epoxy resin does not sufficiently enter up to the back of the recessed portion 2b, it is impossible to securely cover the electronic circuit board 4 so as to seal the board with the resin. This is because the epoxy resin is filled from merely one filling opening portion 9d, whereby the air within the recessed portion 2b has no room to escape to and the spreading of the epoxy resin is prevented by the air reservoir. Further, the opening windows 9a to 9c are opened in addition to the filling opening portion 9d in the recessed portion lid 9, but since the opening windows 9a and 9c are fitted by the recessed portion of the transparent resin cover 12 covering the LED 4a and the switch 4c and the opening window 9b is closed by the porous filter 11, the air is not sufficiently distributed and cannot be discharged satisfactorily.

In the embodiment described above, there is shown the case in which the two filling opening portions 9d and 9e are formed for filling the epoxy resin in the recessed portion lid 9; however, three or more filling opening portions may be formed. In this case, the structure may be made such that the epoxy resin is filled from at least one of the three or more filling opening portions, while the air within the recessed portion 2b is discharged from at least one of the other filling opening portions.

Further, the structures of the recessed portion 2b and the recessed portion lid 9 shown in the embodiment described above are only examples, and the shapes and the structures thereof are optional as far as they are constituted by the recessed portion 2b which is depressed lower than the top face of the container lid 2, and the recessed portion lid 9 covering the recessed portion 2b. Further, in the embodiment described above, there is shown the case in which the epoxy resin is filled in the recessed portion 2b; however, the kind of the resin is optional, and a thermoplastic resin may be filled if it does not affect thermally the mounted components of the electronic circuit board 4.

Further, in the embodiment described above, there is shown the case in which the electronic circuit board 4 mounts thereon the circuit having both the liquid surface detecting function and the state detecting function; however, the electronic circuit board 4 has other functions as described above.

Since the liquid surface detecting function, the state detecting function, and the like of the electronic circuit board 4 may be implemented actually as one circuit having a plurality of functions as described above, description thereof will not be given.

Further, in the embodiment described above, there is shown the case of using the electronic circuit board 4 mounting an electronic circuit on the board, and the mode thereof is as described above. Further, in the embodiment described above, there is shown the case in which an electronic circuit component issues alarms by the LED 4a and the buzzer 4b, and the mode thereof is as described above.

Further, in the embodiment described above, there is shown the case in which the opening windows 9a to 9c are formed in the recessed portion lid 9; however, for example, in the case where the electronic circuit component is not provided with the alarm issuing means or the like, they are not necessary, and in the case where it is provided with light emitting means or display means such as the LED 4a or the like, for example, the recessed portion lid 9 itself may be manufactured from a transparent resin, and it is optional whether or not the opening windows 9a to 9c are formed in the recessed portion lid 9.

Further, the structures of the liquid surface sensor 3 and the liquid surface sensor installation portion 2a shown in the embodiment are only examples as described above.

Further, the structure of the reflow chamber of the container lid 2 shown in the embodiment is merely one example as described above.

Further, in the embodiment described above, the description is given of the liquid type lead acid battery provided with the reflow chamber; however, it is possible to be similarly applied to the lead acid battery provided with no reflow chamber, as far as the electronic circuit component is contained in the recessed portion 2b on the top face of the container lid 2. Accordingly, the lead acid battery can be achieved for every kinds of batteries such as a control valve type, a gel type, and the like.

Fifth Embodiment

Figure 11:
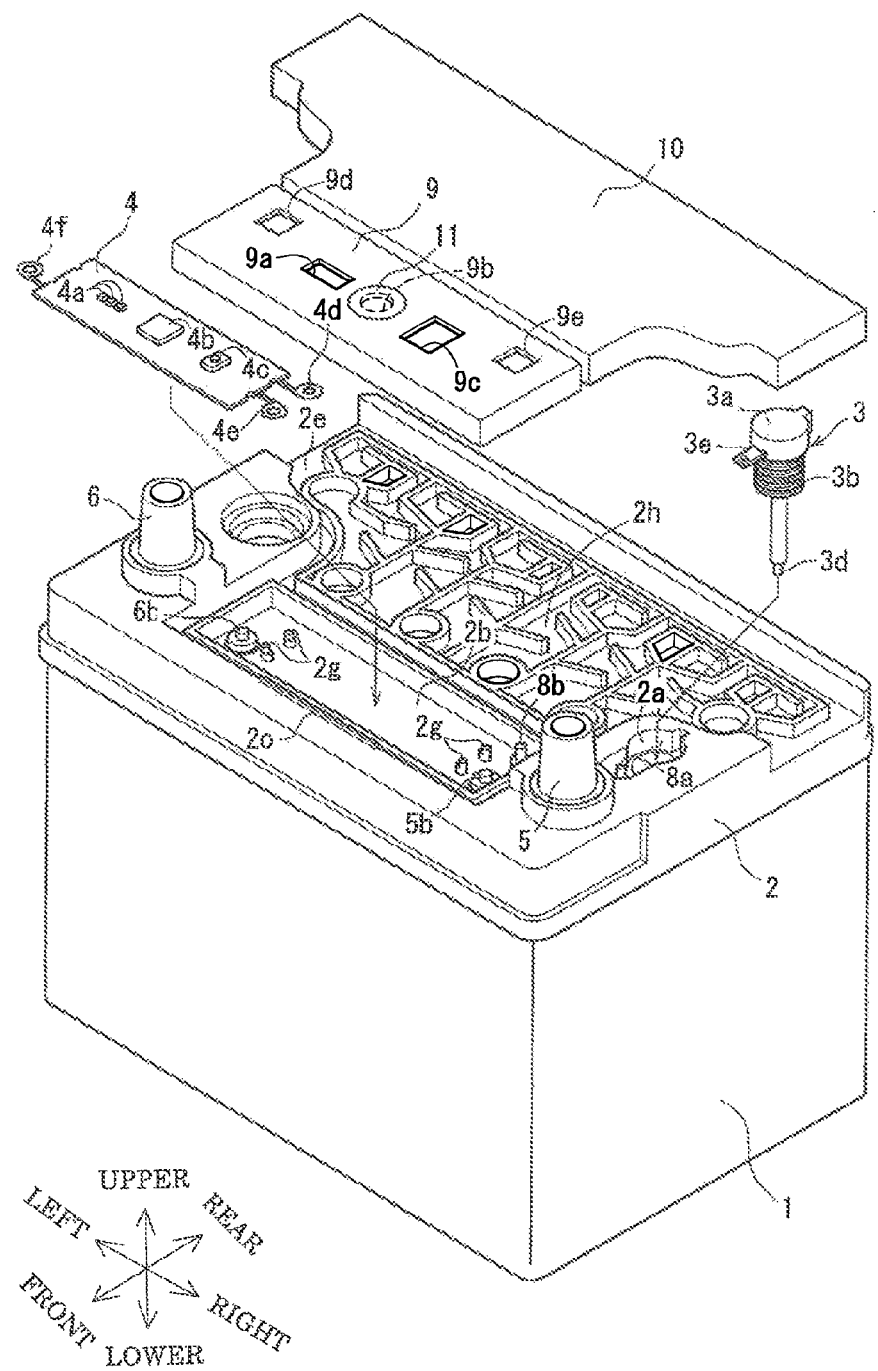
FIG. 11 shows a fifth embodiment in accordance with the present invention and is an exploded perspective view showing a structure of a lead acid battery.

A description will be given of a lead acid battery in accordance with the present embodiment mainly by paying attention to a recessed portion lid covering a recessed portion. The lead acid battery includes a container 1 made of a resin and having a rectangular vessel shape, and a container lid 2 closing and sealing a top end opening portion of the container 1 and made of a resin, as shown in FIG. 11; however, since the internal structure of the container 1 is as described above, description thereof will not be given.

Since the container lid 2 is sealed and firmly attached to the top end opening portion of the container 1 by thermal welding or the like and the positive and negative terminals 5 and 6 made of lead or the like are insert-molded as described above, description thereof will not be given.

Since the liquid surface sensor installation portion 2a is formed on the top face of the container lid 2 as described above, description thereof will not be given.

Since the liquid surface sensor 3 is installed to the liquid surface sensor installation portion 2a as described above, description thereof will not be given.

Further, the recessed portion 2b for containing the electronic circuit board 4 is formed on the top face of the container lid 2, and the details thereof are as described above.

The liquid surface sensor connecting conductor is a connecting conductor made of lead or the like and is structured by integrally connecting the first raised terminal portion 8a and the second raised terminal portion 8b through a rod-like intermediate conductor portion (not shown). Since its structure is as described above, description thereof will not be given.

The liquid surface sensor 3 is installed by inserting a tube body in which a liquid surface detecting electrode 3d is exposed at a lower portion to a through hole of the liquid surface sensor installation portion 2a, press fitting an annular protruding body 3b into the through hole, and fitting a head portion 3a to a rear portion of the hole of the liquid surface sensor installation portion 2a. Since the installing method is as described above, description thereof will not be given.

The sub terminals 5b and 6b are terminal portions derived from the positive and negative terminals 5 and 6 and made of lead or the like, and are provided for connecting to the electronic circuit board 4. Since the details thereof are as described above, description thereof will not be given.

Since the electronic circuit board 4 is a substrate mounting thereon the circuit having both the functions of detecting the liquid surface and detecting the state as described above, description thereof will not be given.

Since the control of the LED 4a and the buzzer 4b by the electronic circuit board 4 is as described above, description thereof will not be given.

The electronic circuit board 4 is supported by the supporting raised bodies 2g at four positions so as to be contained in the recessed portion 2b. The details thereof are as described above.

Figure 12:
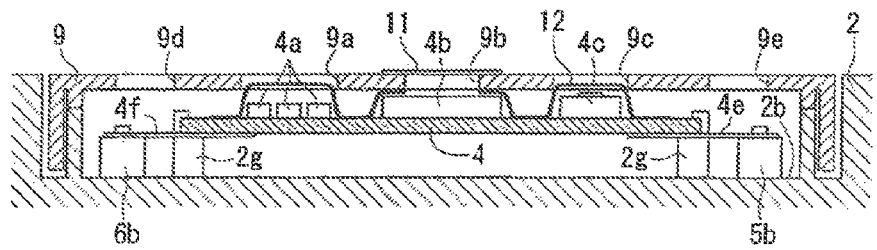
FIG. 12 shows the fifth embodiment in accordance with the present invention and is a partly enlarged longitudinal cross-sectional view showing an electronic circuit board contained in a recessed portion of a container lid.

A transparent resin cover 12 is disposed in the board top face of the electronic circuit board 4 contained in the recessed portion 2b, as shown in FIG. 12. The transparent resin cover 12 is structured such that a recessed portion and a window portion are provided by molding a flat sheet material made of a transparent and flexible polyurethane or the like, covers the LED 4a and the switch 4c by the recessed portion, and exposes the buzzer 4b from the window portion so as to mount the buzzer on the board top face.

The recessed portion 2b is covered with the recessed portion lid 9 and is fixed by thermal welding or the like. The recessed portion lid 9 is a resin lid member having an inverted rectangular bowl shape, as shown in FIGS. 11 and 12, and is structured such that the opening windows 9a to 9c are opened at three positions and the filling opening portions 9d and 9e are opened at both sides thereof. Further, the center opening window 9b is attached by the filter 11 and closed. The filter 11 is made of a porous sheet having a high water repellant property, and is a sheet which can pass the air and the sound, can block off moisture, and is made of a polypropylene (PP) and an organic filler.

The recessed portion lid 9 is structured such that the opening windows 9a to 9c are respectively disposed above the LED 4a, the buzzer 4b, and the switch 4c of the electronic circuit board 4 at a time of covering the recessed portion 2b. Accordingly, the light from the LED 4a penetrates upward through the raised portion of the transparent resin cover 12 and the opening window 9a, the buzzer sound made by the buzzer 4b transmits upward through the window portion of the transparent resin cover 12 and the opening window 9b, and the raised portion of the transparent resin cover 12 is deflected for operation when the switch 4c is pushed from above through the opening window 9c.

A resin is filled in the recessed portion 2b from any one of the filling opening portions 9d and 9e of the recessed portion lid 9. Accordingly, since the electronic circuit board 4 is covered on its upper and lower faces with the resin so as to be protected and the transparent resin cover 12 is covered with the resin except the top portion of the raised portion, the LED 4a and the switch 4c are sealed. Further, since it is not necessary to completely fill the resin to be filled up to the inside ceiling surface of the recessed portion lid 9, it is possible to securely transmit or convey the light from the LED 4a and the buzzer sound made by the buzzer 4b to the outside through the opening windows 9a and 9b of the recessed portion lid 9 by filling the resin in such a manner as not to cover the raised portion of the transparent resin cover 12 and the top portion of the buzzer 4b, and it is also possible to securely operate the switch 4c through the opening window 9c. In this case, the filter 11 prevents the water and the electrolyte solution spotted on the top face of the recessed portion lid 9 from entering the inner portion through the opening window 9b, without shielding the transmission of the buzzer sound of the buzzer 4b through the opening window 9b.

Further, the weld portions between the liquid surface sensor connecting terminal 4d and the electric power supply connecting terminals 4e and 4f derived from the electronic circuit board 4, and the second raised terminal portion 8b and the sub terminals 5b and 6b are covered with the resin for protection. The details thereof are as described above, description thereof will not be given.

Further, a reflow chamber is provided in the container lid 2. Since the details thereof are as described above, description thereof will not be given.

Figure 13:
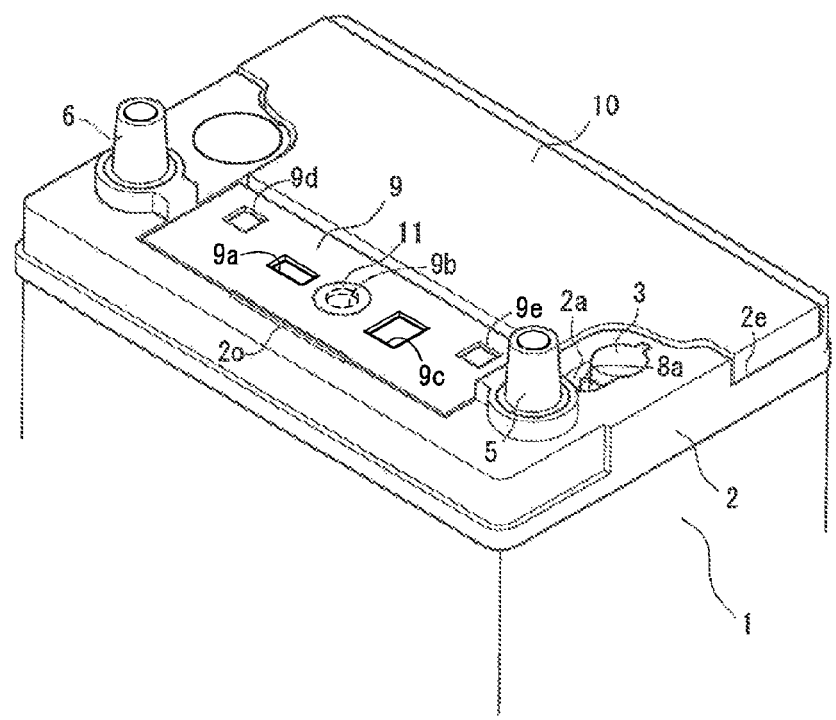
FIG. 13 shows the fifth embodiment in accordance with the present invention and is a perspective view showing a structure of a lead acid battery in which the recessed portion of the container lid is covered with a recessed portion lid.
Figure 14:
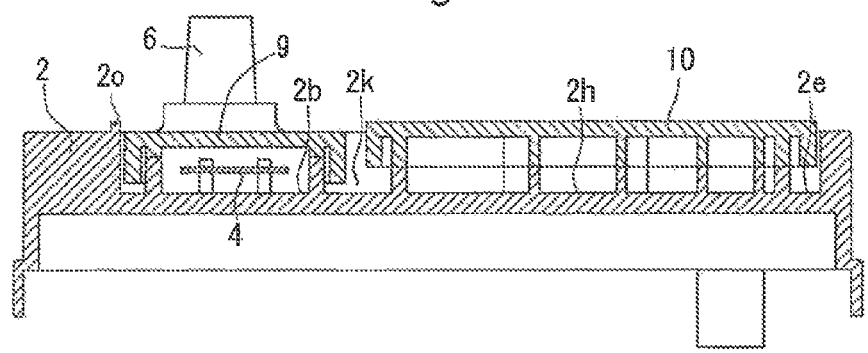
FIG. 14 shows the fifth embodiment in accordance with the present invention and is a longitudinal cross-sectional view of a container lid of the lead acid battery.

The recessed portion lid 9 and the reflow chamber lid 10 are structured, as shown in FIGS. 13 and 14, so as to cover the depression 2e formed on the top face of the container lid 2 in a two-section dividing manner. In this case, the recessed portion lid 9 and the reflow chamber lid 10 can cover the whole of the depression 2e as an integrated top lid. In this case, in the work process of containing the electronic circuit board 4 in the recessed portion 2b and filling the resin while covering the recessed portion with the recessed portion lid 9, workability is better in the case where the work process is carried out before attaching the container lid 2 to the container 1, and there is a risk that the electrolyte solution is spotted in the pouring step of the electrolyte solution after attaching to the container 1. Accordingly, it is preferred to finish the work before the pouring step. However, since most of the liquid pouring ports for pouring the electrolyte solution into each of the cell chambers of the container 1 are formed within the reflow space 2h, the reflow chamber lid 10 can be attached to the container lid 2 only after the container lid 2 is attached to the container 1 and the electrolyte solution has been poured. Accordingly, in the present embodiment, the recessed portion 2b of the depression 2e and the reflow space 2h are covered separately with the recessed portion lid 9 and the reflow chamber lid 10.

Further, if the recessed portion lid 9 and the reflow chamber lid 10 are divided into two pieces as described above, it is possible to more securely seal the electronic circuit board 4 and the like contained in the recessed portion 2b by the recessed portion lid 9 and the filling of the resin so as to prevent water and the electrolyte solution from making an intrusion. Further, in the present embodiment, since the groove portion 2k is formed in the gap between the recessed portion lid 9 and the reflow chamber lid 10, the water and the electrolyte solution spotted on the top face of the container lid 2 can be prevented from making an intrusion into the recessed portion 2b by entering the groove portion 2k. Particularly, in the present embodiment, since the top face of the depression 2e forming the groove portion 2k therein is connected to a side face of the container lid 2, it is possible to quickly discharge the water and the electrolyte solution that have entered the groove portion 2k to the outside.

Further, in the present embodiment, since the top face of the recessed portion lid 9 is made a little lower than the top face of the reflow chamber lid 10, for example, even if a fixture is arranged over the container lid 2 and fastened downward at a time of installing the lead acid battery to a motor vehicle or the like, the fastening force is applied to the reflow chamber lid 10 and is prevented from being applied to the recessed portion lid 9. Since the recessed portion lid 9 covers the recessed portion 2b containing the electronic circuit board 4 and the resin is filled, there is a risk that distortion is generated in the electronic circuit board 4 when external force is applied to the recessed portion lid 9. Accordingly, it is possible to prevent disconnection of the circuit and breakage of the mounted components due to the distortion, by forming the top face of the recessed portion lid 9 lower than the top face of the reflow chamber lid 10.

Further, in the present embodiment, since the raised portion 2o having a higher top face than the recessed portion lid 9 is provided in a front side of the recessed portion 2b in the top face of the container lid 2, the fixture and the like can be supported by the raised portion 2o and the reflow chamber lid 10, and it is possible to more securely prevent external force from being applied to the recessed portion lid 9. In this case, the size and the shape of the raised portion 2o are not limited to the illustrated ones, and the fixture and the like can be supported only by the reflow chamber lid 10 without forming the raised portion 2o. Further, the fixture and the like may be supported only by the raised portion 2o without making the top face of the reflow chamber lid 10 higher than the top face of the recessed portion lid 9. Further, the raised portion 2o described above may be formed in the top face of the other portions of the container lid 2 without being limited to the position shown by the present embodiment, and may be formed at a plurality of positions. Further, the fixture and the like may be supported by making the top face of a component attached to the other portion of the container lid 2 higher than the top face of the recessed portion lid 9 in place of the raised portion 2o or together with the raised portion 2o.

In accordance with the present embodiment, the electronic circuit board 4 can be contained in the container lid 2, and the reflow chamber can be provided in the container lid 2. Further, since the electronic circuit board 4 is contained in the recessed portion 2b formed on the top face of the container lid 2 so as to be covered with the recessed portion lid 9 and be filled with the resin, and the reflow chamber is covered with the reflow chamber lid 10 in the reflow space 2h formed on the top face of the container lid 2, it is possible to improve assembling workability, to securely prevent water and the electrolyte solution from entering the recessed portion 2b containing the electronic circuit board 4, and to prevent distortion caused by external force from being generated in the electronic circuit board 4.

In the embodiment described above, there is shown the case in which the electronic circuit board 4 is structured so as to mount the circuit having both the liquid surface detecting function and the state detecting function thereon. Since the details thereof are as described above, description thereof will not be given.

The liquid surface detecting circuit, the state detecting circuit, and the like of the electronic circuit board 4 may be actually implemented as one electronic circuit provided with a plurality of functions, as described above.

Further, in the embodiment described above, there is shown the case of using the electronic circuit board 4 mounting an electronic circuit on the board; however, other modes are as described above.

Further, the structure of the recessed portion 2b shown in the embodiment described above is merely one example, and the shape and the structure are optional as far as the recessed portion is formed on the top face of the container lid 2. Further, the structure of the recessed portion lid 9 shown in the embodiment described above is merely one example, and the shape and the structure are optional as far as it covers the recessed portion 2b. Further, the filter 11 covering the opening window 9b at the center of the recessed portion lid 9 is not necessarily limited to a sheet made of polypropylene and an organic filler, as far as it is a porous sheet having a high water repellant property, can pass the air and the sound therethrough, and can block moisture. Further, the recessed portion 2b is not limited to the recessed portion covered with the recessed portion lid 9 and filled with resin. Further, the containing means and the connecting means of the electronic circuit board 4 are optional without being limited to the supporting raised body 2g and the connecting terminals 4d to 4f.

Further, the structure of the liquid surface sensor 3 shown in the embodiment described above is merely one example, and a liquid surface sensor 3 having another structure may be used in the case of using the liquid surface sensor 3. For example, the liquid surface sensor 3 may be structured so as to detect the liquid surface of the electrolyte solution by using an optical sensor, and whatever structure may be employed as far as it outputs the liquid surface state of the electrolyte solution as a signal such as an electric signal. Further, the liquid surface sensor installation portion 2a may have an appropriate structure depending on the liquid surface sensor 3. Further, the structure for connecting the electronic circuit board 4 shown in the embodiment described above to the liquid surface sensor 3 and the positive and negative terminals 5 and 6 is optional without being limited to a liquid surface sensor connecting conductor insert-molded in the container lid 2 and the sub terminals 5b and 6b.

Further, in the embodiment described above, there is shown the case of detecting only the liquid surface of the electrolyte solution in one cell chamber by using one liquid surface sensor 3; however, using two or more liquid surface sensors 3 and the like is as described above.

Further, the structure of the reflow chamber of the container lid 2 shown in the embodiment described above is merely one example as described above.

Further, in the embodiment described above, the description is given of the lead acid battery in which the internal portion of the container 1 is divided into a plurality of cell chambers; however, the present invention can be applied to other batteries as described above.

INDUSTRIAL APPLICABILITY

It is possible to prevent an electronic circuit component and an electric component, or an electric component connecting conductor and a terminal connecting conductor connecting between the components and the terminals from being disconnected, e.g., by catching on an object on the top face of a container lid, to prevent corrosion by an electrolyte solution spotted on the top face of the container lid, and also to improve the outer appearance. Accordingly, great industrial applicability is obtained.

The invention claimed is:

1. A lead acid battery comprising:
an electric component installed in an electric component installation portion on a top face of a container lid;
an electronic circuit component contained in a recessed portion on the top face of the container lid; and
an electric component connecting conductor insert-molded in the container lid so as to be fixedly adhered within the container lid, wherein the electric component is connected with the electronic circuit component by the electric component connecting conductor,
wherein the electric component connecting conductor includes a first raised terminal portion for connecting the electric component, a second raised terminal portion for connecting the electronic circuit component, and a rod-shaped intermediate conductor portion for connecting both the raised terminal portions, and
wherein the electric component is a liquid surface sensor.

* * * * *